(12) United States Patent
Zalevsky et al.

(10) Patent No.: US 11,506,604 B2
(45) Date of Patent: Nov. 22, 2022

(54) PLASMA DISPERSION EFFECT BASED SUPER-RESOLVED IMAGING

(71) Applicant: BAR ILAN UNIVERSITY, Ramat Gan (IL)

(72) Inventors: Zeev Zalevsky, Rosh HaAyin (IL); Moshe Sinvani, Rishon Lezion (IL); Meir Danino, Modiin (IL); Hadar Pinhas, Petach Tiqva (IL); Omer Wagner, Rosh HaAyin (IL); Yossef Danan, Rehovot (IL)

(73) Assignee: BAR ILAN UNIVERSITY, Ramat Gan (IL)

( * ) Notice: Subject to any disclaimer, the term of this patent is extended or adjusted under 35 U.S.C. 154(b) by 27 days.

(21) Appl. No.: 17/013,696

(22) Filed: Sep. 7, 2020

(65) Prior Publication Data

US 2021/0072153 A1 Mar. 11, 2021

Related U.S. Application Data

(60) Provisional application No. 62/895,997, filed on Sep. 5, 2019.

(51) Int. Cl.
*G02B 27/58* (2006.01)
*G01N 21/63* (2006.01)
*G01N 21/47* (2006.01)
*G01N 21/84* (2006.01)

(52) U.S. Cl.
CPC ......... *G01N 21/63* (2013.01); *G01N 21/4788* (2013.01); *G01N 21/84* (2013.01); *G02B 27/58* (2013.01)

(58) Field of Classification Search
CPC .... G01N 21/63; G01N 21/4788; G01N 21/84; G02B 27/58
USPC ............................................. 356/237.1–237.6
See application file for complete search history.

(56) References Cited

U.S. PATENT DOCUMENTS

| | | | | |
|---|---|---|---|---|
| 6,208,458 | B1* | 3/2001 | Galvanauskas | B23K 26/40 359/332 |
| 7,009,695 | B2* | 3/2006 | Some | G01N 25/72 356/237.1 |
| 7,723,642 | B2* | 5/2010 | Gu | H01L 21/485 219/121.61 |
| 2008/0231845 | A1* | 9/2008 | Grossman | G01N 21/1717 356/237.5 |
| 2016/0103307 | A1* | 4/2016 | Frankel | A61B 5/0071 600/317 |
| 2017/0102532 | A1* | 4/2017 | Frankel | G02B 21/0032 |
| 2018/0246032 | A1* | 8/2018 | Li | G01N 21/3563 |
| 2018/0246308 | A1* | 8/2018 | Shi | G02B 21/0072 |
| 2018/0284025 | A1* | 10/2018 | Gozali | G02B 21/0036 |

OTHER PUBLICATIONS

R. Aharoni, M. Sinvani, O. Baharav, M. Azoulai, and Z. Zalevsky, "Experimental Characterization of Photonic Fiber-Integrated Modulator," Open Opt. J. 5(1), 40-45 (2011).

(Continued)

*Primary Examiner* — Isiaka O Akanbi
(74) *Attorney, Agent, or Firm* — The Roy Gross Law Firm, LLC; Roy Gross

(57) ABSTRACT

Disclosed herein is a super resolution imaging method and system for obtaining an image in a crystal material and/or device.

5 Claims, 14 Drawing Sheets

(56) References Cited

OTHER PUBLICATIONS

R. Aharoni, O. Baharav, L. Bidani, M. Sinvani, D. Elbaz, and Z. Zalevsky, "All-optical silicon simplified passive modulation," J. Eur. Opt. Soc.—Rapid Publ. 7(12029), (2012).

T. Auguste, P. Monot, L.-A. Lompr6, G. Mainfray, and C. Manus, "Defocusing effects of a picosecond terawatt laser pulse in an underdense plasma," Opt. Commun. 89, 145-148 (1992).

W. P. Beeker, P. Groß, C. J. Lee, C. Cleff, H. L. Offerhaus, C. Fallnich, J. L. Herek, and K.-J. Boller, "A route to sub-diffraction-limited CARS Microscopy," Opt Express 17(25), 22632 (2009).

E. Betzig, J. K. Trautman, T. D. Harris, J. S. Weiner, and R. L. Kostelak, "Breaking the diffraction barrier: optical microscopy on a nanometric scale.," Science 251(5000), 1468-1470 (2006).

L. Bidani, O. Baharav, M. Sinvani, and Z. Zalevsky, "Usage of Laser Timing Probe for Sensing of Programmed Charges in EEPROM Devices," IEEE Trans. Device Mater. Reliab. 14(1), 304-310 (2014).

C. Boit, R. Schlangen, A. Glowacki, U. Kindereit, T. Kiyan, U. Kerst, T. Lundquist, S. Kasapi, and H. Suzuki, "Physical IC debug—backside approach and nanoscale challenge," Adv Radio Sci 6, 265-272 (2008).

C. Canali, C. Jacoboni, F. Nava, G. Ottaviani, and A. Alberigi-Quaranta, "Electron drift velocity in silicon," Phys. Rev. B 12(6), 2265-2284 (1975).

S.-W. Chu, T.-Y. Su, R. Oketani, Y.-T. Huang, H.-Y. Wu, Y. Yonemaru, M. Yamanaka, H. Lee, G.-Y. Zhuo, M.-Y. Lee, S. Kawata, and K. Fujita, "Measurement of a Saturated Emission of Optical Radiation from Gold Nanoparticles: Application to an Ultrahigh Resolution Microscope," Phys. Rev. Lett. 112(1), 17402 (2014).

C. Cleff, P. Groß, C. Fallnich, H. L. Offerhaus, J. L. Herek, K. Kruse, W. P. Beeker, C. J. Lee, and K.-J. Boller, "Ground-state depletion for subdiffraction-limited spatial resolution in coherent anti-Stokes Raman scattering microscopy," Phys. Rev. A 86(2), 23825 (2012).

D. Alamo and R. M. Swanson, "Modelling of minority-carriers transport in heavily doped silicon emitters," 30, (1987).

Y. Danan, T. Ilovitsh, Y. Ramon, D. Malka, D. Liu, and Z. Zalevsky, "Silicon-coated gold nanoparticles nanoscopy," J. Nanophotonics 10(3), 36015 (2016).

Abbe, E. Beiträge zur Theorie des Mikroskops und der mikroskopischen Wahrnehmung. Archiv f. mikrosk. Anatomie 9, 413-468 (1873). https://doi.org/10.1007/BF02956173.

C. Jun and H.-J. Eichler, "Laser Beam Defocusing at 1.06 gm by Carrier Excitation in Silicon," Appl. Phys. B 45, 121-124 (1988).

M. Fernández-Suarez and A. Y. Ting, "Fluorescent probes for super-resolution imaging in living cells," Nat. Rev. Mol. Cell Biol. 9(12), 929-943 (2008).

S. K. Garth, Y. H. Chen, and A. E. Stephens, "Effects of Dislocation and Bulk Micro Defects on Device Leakage," SEMICON Taiwan (2001).

M. G. L. Gustafsson, "Nonlinear structured-illumination microscopy: wide-field fluorescence imaging with theoretically unlimited resolution.," Proc. Natl. Acad Sci. U. S. A. 102(37), 13081-13086 (2005).

H. K. Heinrich, D. M. Bloom, and B. R. Hemenway, "Noninvasive sheet charge density probe for integrated silicon devices," Appl. Phys. Lett. 48(16), 1066-1068 (1986).

S. Hell and E. H. K. Stelzer, "Fundamental improvement of resolution with a 4Pi-confocal fluorescence microscope using two-photon excitation," Opt. Commun 93, 277-282 (1992).

S. W. Hell and J. Wichmann, "Breaking the diffraction resolution limit by stimulated emission: stimulatedemission-depletion fluorescence microscopy," Opt Lett 19(11), 780 (1994).

S. W. Hell, "Far-field optical nanoscopy.," Science 316(5828), 1153-8 (2007).

S. W. Hell, "Microscopy and its focal switch," Nat. Methods 6(1), 24-32 (2009).

M. Hofmann, C. Eggeling, S. Jakobs, and S. W. Hell, "Breaking the diffraction barrier in fluorescence microscopy at low light intensities by using reversibly photoswitchable proteins.," Proc. Natl. Acad. Sci. U. S. A. 102(49), 17565-9 (2005).

B. Huang, H. Babcock, and X. Zhuang, "Breaking the Diffraction Barrier: Super-Resolution Imaging of Cells," Cell 143(7), 1047-1058 (2010).

T. A. Klar and S. W. Hell, "Subdiffraction resolution in far-field fluorescence microscopy," Opt. Lett. 24(14), (1999).

V. V. Kononenko, E. V. Zavedeev, and V. M. Gololobov,"The effect of light-induced plasma on propagation of intense s laser radiation in c-Si," Appl. Phys. A 122, (2016).

C. Boit, H. Lohrke, P. Scholz, A. Beyreuther, U. Kerst, and Y. Iwaki, "Contactless visible light probing for nanoscale ICs through 10 μm bulk silicon," in Proceedings of the 35th Annual NANO Testing Symposium (NANOTS2015) (2015), pp. 215-221.

H. Lohrke, S. Tajik, C. Boit, and J. P. Seifert, No Place to Hide: Contactless Probing of Secret Data on FPGAs (2016).

D. A. Nedosekin, E. I. Galanzha, E. Dervishi, A. S. Biris, and V. P. Zharov, "Super-Resolution Nonlinear Photothermal Microscopy," Small 10(1), 135-142 (2014).

H. Pinhas, L. Bidani, O. Baharav, M. Sinvani, M. Danino, and Z. Zalevsky, "All optical modulator based on silicon resonator," in SPIE (2015), 9609, p. 96090L-96090L-7.

H. Pinhas, Y. Danan, M. Sinvani, M. Danino, and Z. Zalevsky, "Experimental characterization towards an infibre integrated silicon slab based all-optical modulator," J. Eur. Opt. Soc. Publ. 13(1), 3 (2017).

V. Raghunathan and E. O. Potma, "Multiplicative and subtractive focal volume engineering in coherent Raman microscopy.," J. Opt. Soc. Am. A. Opt. Image Sci. Vis. 27(11), 2365-74 (2010).

L. R. S. R. Rayleigh, "XV. On the theory of optical images, with special reference to the microscope," Philos. Mag. Ser. 5 42(255), 167-195 (1896).

E. Rittweger, K. Y. Han, S. E. Irvine, C. Eggeling, and S. W. Hell, "STED microscopy reveals crystal colour centres with nanometric resolution," Nat. Photonics 3(3), 144-147 (2009).

M. J. Rust, M. Bates, and X. Zhuang, "Sub-diffraction-limit imaging by stochastic optical reconstruction microscopy (STORM)," Nat. Methods 3(10), 793-796 (2006).

S. Sayil, D. Kerns, and S. Kerns, "All-silicon optical contactless testing of integrated circuits," Int. J. Electron. 89(7), 537-547 (2002).

L. Schermelleh, R. Heintzmann, and H. Leonhardt, "A guide to super-resolution fluorescence microscopy.," J. Cell Biol. 190(2), 165-75 (2010).

R. A. Soref and B. R. Bennett, "Electrooptical effects in silicon," IEEE J. Quantum Electron. 23(1), 123-129 (1987).

H.-Y. Tsai, S. W. Thomas, and R. Menon, "Parallel scanning-optical nanoscopy with optically confined probes," Opt. Express 18(15), 16014 (2010).

M. S. Tyagi and R. Van Overstraeten, "Minority carrier recombination in heavily-doped silicon," Solid-Slate Electron. 26(6), 577-597 (1983).

O. Tzang, A. Pevzner, R. E. Marvel, R. F. Haglund, and O. Cheshnovsky, "Super-Resolution in Label-Free Photomodulated Reflectivity," Nano Lett. 15(2), 1362-1367 (2015).

W. Y. Lo and S. M. Puchalski, "Digital Image Processing," Vet. Radiol. Ultrasound 49, S42-S47 (2008).

X. Wang, Z. H. Shen, J. Lu, and X. W. Ni, "Laser-induced damage threshold of silicon in millisecond, nanosecond, and picosecond regimes," J. Appl. Phys. 108(3), 33103 (2010).

P. Wang, M. N. Slipchenko, J. Mitchell, C. Yang, E. O. Potma, X. Xu, and J.-X. Cheng, "Far-field imaging of non-fluorescent species with subdiffraction resolution," Nat. Photonics 7(6), 449-453 (2013).

Zalevsky, Zeev & Mendlovic, David & Lohmann, Adolf. (2000). IV Optical systems with improved resolving power. Progress in Optics. 40.271-341. 10.1016/80079-6638(00)80032-3.

"Holo-OR VL-209-Q-Y-A Vortex Lens—spiral phase plate (Ness Ziona, Israel, http://www.holoor.co.il/Diffractive_Optics_Products/Diffractive_Vortex_Lens/Vortex-lens.php)," (n.d.).

* cited by examiner

PLASMA DISPERSION EFFECT BASED SUPER-RESOLVED IMAGING

CROSS REFERENCE TO RELATED APPLICATIONS

This application claims the benefit of priority to U.S. Provisional Patent Application No. 62/895,997 filed Sep. 5, 2019, entitled "PLASMA DISPERSION EFFECT BASED SUPER-RESOLVED IMAGING IN SILICON", the contents of which are incorporated herein by reference in their entirety.

FIELD OF THE INVENTION

The present invention is in the field of optical microscopy and super-resolution non-contact optical methods.

BACKGROUND OF THE INVENTION

In optical microscopy, the resolution that can be obtained is limited by the diffraction property of light. This diffraction limit means that far field optical microscopes cannot show details smaller than half of the wavelength of the illuminating light. Over the years a great effort was invested to break the diffraction limit barrier.

Optical microscopy plays an important role in imaging and probing techniques for contactless inspection and metrology of for example, silicon integrated circuits (ICs). The main tool in this technology is an IR laser beam acting as a contactless probe applied on the IC from its back side while allowing direct access to the active areas buried inside the silicon chip. To date, where the ICs production technology is size around 10 nanometer, there are no effective methods in the literature for super-resolution in silicon microscopy.

Thus, there is a continuing need for the development of methods for super-resolution in silicon microscopy and to overcome the diffraction resolution limit in silicon microscopy on and deep under the silicon surface.

SUMMARY OF THE INVENTION

In one aspect of the invention, there is provided a super resolution imaging method for obtaining an image in a crystal, the method comprising:
  i. providing a crystal;
  ii. projecting:
    a pump beam comprising a Gaussian beam or a doughnut beam into the crystal surface, thereby creating a free charge carrier (FCC) density pattern; and
    a collinear probe beam into the crystal surface,
    thereby controlling the lateral and temporal transmission of the probe beam.

In some embodiments, the probe beam comprises a Gaussian beam.

In some embodiments, the pump beam is projected at 20000 picosecond (ps) to 20 femtosecond (fs) pulse width.

In some embodiments, the probe beam is projected at 20000 ps to 20 fs pulse width.

In some embodiments, the pump beam and the probe beam are pulsed at a repetition rate between 1 pulses and 500,000 pulses per second.

In some embodiments, the crystal comprises a thickness of 1 micrometer ($\mu m$) to 100 $\mu m$.

In some embodiments, the doughnut beam comprises an inner diameter ranging from 0.1 $\mu m$ to 40 $\mu m$ and a doughnut width ranging from 0.1 $\mu m$ to 10 $\mu m$.

In some embodiments, the point spread function (PSF) diameter of the pump beam is calculated according to the resolution (r) formula: $r=\lambda/2NA$.

In some embodiments, the point spread function (PSF) diameter of the pump beam is in the range of 0.1 $\mu m$ to 40 $\mu m$.

In some embodiments, the wavelength (k) ratio of the probe beam to the pump beam is between 4:1 and 1:1.

In some embodiments, the wavelength (k) of the probe beam is between 1000 nanometer (nm) and 2000 nm.

In some embodiments, the wavelength ($\lambda$) of the pump beam is between 500 nm and 1000 nm.

In some embodiments, the crystal comprises a semiconductor selected from silicon, germanium, gallium arsenide, cadmium, selenide, or any combination thereof.

In some embodiments, the method is characterized by a penetration depth of the pump beam in the crystal surface between 1 nm and 100 $\mu m$.

In some embodiments, the method is characterized by an absorption coefficient (a) in the range of 5 $cm^{-1}$ to $10^3$ $cm^{-1}$.

In some embodiments, the free charge carrier (FCC) density pattern is controlled by a vortex plate with a topological order of 0 to 8.

In another aspect of the invention, there is provided a super resolution imaging system for obtaining an image in a crystal, comprising:
  a laser configured to project a pump beam and a probe beam collinearly into the crystal surface;
  a vortex phase plate positioned between the pump beam source and the crystal; and
  a control unit configured to control the shape of the pump beam, thereby controlling the lateral and temporal transmission of the probe beam.

In some embodiments, the control unit is configure to provide a predetermined beam pulse width and wavelength of the pump beam and the probe beam.

In some embodiments, the control unit is configured to control the vortex phase plate topological order from 0 to 8.

In some embodiments, the control unit is configured to control the distance of the pump beam focal point.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1B:
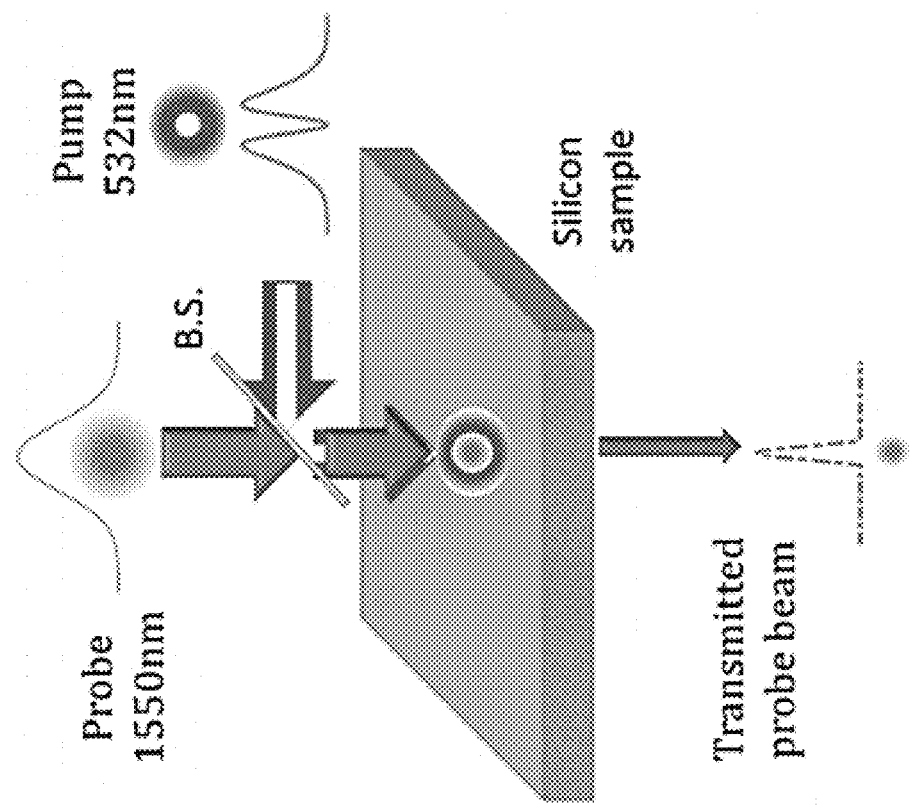
FIGS. 1A-B Present illustrations of the principle of the proposed two beam shaping methods: a) A narrow pump Gaussian beam at 532 nm, creates a hole in the middle of a wider IR beam (FIG. 1A) and donut shape 532 nm pump beam blocks the periphery of the IR beam Gaussian and transmits a narrow beam in its center only (FIG. 1B)

The present invention, in some embodiments thereof, is directed to a super resolution imaging method for obtaining an image in a crystal. In some embodiments, there is provided a super resolution imaging method for obtaining an image in a crystal material. In some embodiments, there is provided a super resolution imaging method for obtaining an image in a crystal device. In some embodiments, there is provided a super resolution imaging method for obtaining an image of a semiconductor.

According to one aspect, there is provided a method for shaping an InfraRed (IR) laser beam in a crystal. In some embodiments, there is presented a method for shaping, narrowing or both, an IR laser beam in a crystal. In some embodiments, there is presented a method for shaping IR laser beam in a crystal by changing the crystals refractive index using a pump laser beam. In some embodiments, the pump laser beam shapes the point spread function (PSF) by controlling the lateral transmission of the IR beam. In some embodiments, the pump laser beam simultaneously and collinearly illuminates the crystal's surface with the IR probe beam.

In some embodiments, the crystal comprises a semiconductor. In some embodiments, the crystal is a semiconductor. In some embodiments, the semiconductor comprises silicon.

In some embodiments, the crystal is devoid of photochromic layer. In some embodiments, the crystal is devoid of contrast agent. In some embodiments, the crystal is devoid of a florescent material.

In some embodiments, the semiconductor is devoid of photochromic layer. In some embodiments, the semiconductor is devoid of contrast agent. In some embodiments, the semiconductor is devoid of a florescent material.

The present invention is based, in part, on a surprising finding that according to the method of the present invention, it is possible to obtain a focusing of the laser beam from the defocusing effect. This is possible by using a pump laser beam comprising a doughnut shape. In some embodiments, the doughnut shape is created by a vortex plate. The diameter of the donut pump beam on the crystals surface can be predetermined and controlled by controlling the distance from the pump beam focal point and/or by controlling the vortex's topological order.

According to another aspect, there is provided a super resolution imaging system for obtaining an image in a crystal.

In some embodiments, the method improves the imaging resolution. In some embodiments, the system improves the imaging resolution.

The Method

According to one aspect, there is provided a method for obtaining an image in a crystal, the method comprising (a). providing a crystal, (b). projecting a pump beam comprising a Gaussian beam or a doughnut beam into the crystals surface, thereby creating a free charge carrier (FCC) density pattern; and (c). projecting a collinear probe beam into the crystals surface, thereby controlling the lateral and temporal transmission of the probe beam. In some embodiments, the crystal comprises a semiconductor.

In some embodiments, the probe beam comprises a Gaussian beam.

As used herein, "pump beam" refers to a stronger beam used to excite a samples surface, generating a non-equilibrium state. In some embodiments, the first beam refers to a pump beam. As used herein, "probe beam" refers to a weaker beam used to monitor the pump-induced changes in the optical constants (such as reflectivity or transmission) of the sample. In some embodiments, the second beam refers to a probe beam.

As used herein, "crystal" refers to a crystalline solid which is a solid material whose constituents (such as atoms, molecules, or ions) are arranged in a highly ordered microscopic structure, forming a crystal lattice that extends in all directions.

In some embodiments, the first beam and the second beam comprise the same shape. In some embodiments, the first beam and the second beam comprise different shapes.

In some embodiments, the first beam and the second beam originate from the same source. In some embodiments, the first beam and the second beam originate from a different source.

In some embodiments, the pump beam and the probe beam originate from the same source. In some embodiments, the pump beam and the probe beam originate from a different source. In some embodiments, the pump beam and the probe beam are projected from a laser. In some embodiments, the pump beam is projected from a first laser and the probe beam is projected from a second laser.

In some embodiments, the pump beam and the probe beam originate from a single beam. In some embodiments, the single beam is broken into a probe beam and a pump beam.

In some embodiments, the pump beam and the probe beam are collinear and synchronized at 5 Hz to 500 kHz, 5 Hz to 250 kHz, 5 Hz to 150 kHz, 5 Hz to 100 kHz, 5 Hz to 500 Hz, 50 Hz to 250 kHz, 50 kHz to 500 kHz, 50 kHz to 250 kHz, 50 kHz to 150 kHz, 50 kHz to 100 kHz, 90 kHz to 500 kHz, 90 kHz to 250 kHz, 90 kHz to 150 kHz, 90 kHz to 100 kHz, 100 kHz to 500 kHz, 100 kHz to 250 kHz, or 100 kHz to 150 kHz, including any range therebetween.

In some embodiments, the pump beam is projected at 20000 (picosecond) ps to 20 femtosecond (fs), 20000 ps to 15 fs, 20000 ps to 10 fs, 20000 ps to 5 fs, 20000 ps to 1 fs, 1000 ps to 15 fs, 1000 ps to 10 fs, 1000 ps to 5 fs, 1000 ps to 1 fs, 500 ps to 15 fs, 500 ps to 10 fs, 500 ps to 5 fs, 500 ps to 1 fs, 10 ps to 15 fs, 10 ps to 10 fs, 10 ps to 5 fs, 10 ps to 1 fs, 1 ps to 15 fs, 1 ps to 10 fs, 1 ps to 5 fs, or 1 ps to 1 fs, pulse width, including any range therebetween.

In some embodiments, the probe beam is projected at 20 ps to 20 fs, 10 ps to 15 fs, 10 ps to 10 fs, 10 ps to 5 fs, 10 ps to 1 fs, 1 ps to 15 fs, 1 ps to 10 fs, 1 ps to 5 fs, or 1 ps to 1 fs, pulse width, including any range therebetween.

In some embodiments, the first beam and the second beam are pulsed at a repetition rate between 1 pulses and 500,000 pulses per second 5 pulses and 500,000 pulses per second, 10 pulses and 500,000 pulses per second, 30 pulses and 500,000 pulses per second, 50 pulses and 500,000 pulses per second, 100 pulses and 500,000 pulses per second, 500 pulses and 500,000 pulses per second, 1000 pulses and 500,000 pulses per second, between 5 pulses and 100,000 pulses per second, 10 pulses and 100,000 pulses per second, 30 pulses and 100,000 pulses per second, 50 pulses and 100,000 pulses per second, 100 pulses and 100,000 pulses per second, 500 pulses and 100,000 pulses per second, 1000 pulses and 100,000 pulses per second, or 10,000 pulses and 100,000 pulses per second, including any range therebetween.

In some embodiments, the crystal comprises a thickness in the range of 1 μm to 500 μm, 1 μm to 300 μm, 1 μm to 100 μm, 1 μm to 90 μm, 1 μm to 50 μm, 1 μm to 10 μm, 5 μm to 500 μm, 5 μm to 300 μm, 5 μm to 100 μm, 5 μm to 90 μm, 5 μm to 50 μm, 5 μm to 10 μm, 10 μm to 500 μm, 10 μm to 300 μm, 10 μm to 100 μm, 10 μm to 90 μm, or 10 μm to 50 μm, including any range therebetween.

In some embodiments, the semiconductor comprises a thickness in the range of 1 μm to 500 μm, 1 μm to 300 μm, 1 μm to 100 μm, 1 μm to 90 μm, 1 μm to 50 μm, 1 μm to 10 μm, 5 μm to 500 μm, 5 μm to 300 μm, 5 μm to 100 μm, 5 μm to 90 μm, 5 μm to 50 μm, 5 μm to 10 μm, 10 μm to 500 μm, 10 μm to 300 μm, 10 μm to 100 μm, 10 μm to 90 μm, or 10 μm to 50 μm, including any range therebetween.

In some embodiments, the doughnut beam comprises an inner diameter ranging from 0.1 μm to 40 μm, 0.5 μm to 40 μm, 0.9 μm to 40 μm, 1 μm to 40 μm, 5 μm to 40 μm, 10 μm to 40 μm, 15 μm to 40 μm, 0.1 μm to 35 μm, 0.5 μm to 35 μm, 0.9 μm to 35 μm, 1 μm to 35 μm, 5 μm to 35 μm, 10 μm to 35 μm, 15 μm to 35 μm, 0.1 μm to 15 μm, 0.5 μm to 15 μm, 0.9 μm to 15 μm, 1 μm to 15 μm, or 5 μm to 15 μm, including any range therebetween.

In some embodiments, the doughnut beam comprises a doughnut width ranging from 0.1 μm to 10 μm, 0.5 μm to 10 μm, 0.9 μm to 10 μm, 1 μm to 10 μm, 5 μm to 10 μm, 0.1 μm to 7 μm, 0.5 μm to 7 μm, 0.9 μm to 7 μm, 1 μm to 7 μm, 5 μm to 7 μm, 0.1 μm to 5 μm, 0.5 μm to 5 μm, 0.9 μm to 5 μm, or 1 μm to 5 μm, including any range therebetween.

In some embodiments, the point spread function (PSF) diameter of the probe beam is in the range of 0.6 μm to 40 μm, 0.9 μm to 40 μm, 1 μm to 40 μm, 5 μm to 40 μm, 10 μm to 40 μm, 15 μm to 40 μm, 0.6 μm to 35 μm, 0.9 μm to 35 μm, 1 μm to 35 μm, 5 μm to 35 μm, 10 μm to 35 μm, 15 μm to 35 μm, 0.6 μm to 15 μm, 0.9 μm to 15 μm, 1 μm to 15 μm, or 5 μm to 15 μm, including any range therebetween.

In some embodiments, the point spread function (PSF) diameter of the pump beam is in the range of 0.1 μm to 40 μm, 0.5 μm to 40 μm, 0.9 μm to 40 μm, 1 μm to 40 μm, 5 μm to 40 μm, 10 μm to 40 μm, 15 μm to 40 μm, 0.1 μm to 35 μm, 0.5 μm to 35 μm, 0.9 μm to 35 μm, 1 μm to 35 μm, 5 μm to 35 μm, 10 μm to 35 μm, 15 μm to 35 μm, 0.1 μm to 15 μm, 0.5 μm to 15 μm, 0.9 μm to 15 μm, 1 μm to 15 μm, or 5 μm to 15 μm, including any range therebetween.

In some embodiments, the wavelength (λ) ratio of the pump beam to the probe beam is between 4:1 and 1:1, 3:1 and 1:1, 2:1 and 1:1, 4:1 and 3:1, or 4:1 and 2:1, including any range therebetween.

In some embodiments, the wavelength (λ) of the probe beam is between 1000 nm and 2000 nm, 1200 nm and 2000 nm, 1500 nm and 2000 nm, 1000 nm and 1900 nm, 1200 nm and 1900 nm, 1500 nm and 1900 nm, 1000 nm and 1600 nm, or 1200 nm and 1600 nm, including any range therebetween.

In some embodiments, the wavelength (λ) of the pump beam is below the absorption edge of the semiconductor. In some embodiments, the wavelength (λ) of the first beam is between 500 nm and 1000 nm, 500 nm and 900 nm, 600 nm and 1000 nm, 600 nm and 900 nm, 500 nm and 800 nm, or 600 nm and 800 nm, including any range therebetween.

As used herein, the term "semiconductor" refers to any material with an electrical conductivity value falling between that of a conductor (such as metallic copper), and an insulator (such as glass). Non-limiting examples of a semiconductor according to the present invention include silicon, germanium, gallium arsenide, cadmium, and selenide. In some embodiments, the semiconductor comprises silicon, germanium, gallium arsenide, cadmium, selenide, or any combination thereof.

In some embodiments, the pump beam is characterized by a pulse fluence intensity ranging from 0.1 J/cm$^2$ to 0.9 J/cm$^2$, 0.1 J/cm$^2$ to 0.6 J/cm$^2$, or 0.1 J/cm$^2$ to 0.5 J/cm$^2$, including any range therebetween. In some embodiments, the pump beam is characterized by a pulse fluence intensity up to 0.5 J/cm$^2$, up to 0.4 J/cm$^2$, up to 0.3 J/cm$^2$, or up to 0.2 J/cm$^2$, including any value therebetween.

In some embodiments, the method is characterized by an absorption coefficient (a) in the range of 5 cm$^{-1}$ to 9000 cm$^{-1}$, 5 cm$^{-1}$ to 5000 cm$^{-1}$, 5 cm$^{-1}$ to 1000 cm$^{-1}$, 5 cm$^{-1}$ to 500 cm$^{-1}$, 7 cm$^{-1}$ to 100 cm$^{-1}$, 7 cm$^{-1}$ to 50 cm$^{-1}$, 5 cm$^{-1}$ to 20 cm$^{-1}$, 5 cm$^{-1}$ to 19 cm$^{-1}$, 5 cm$^{-1}$ to 12 cm$^{-1}$, 5 cm$^{-1}$ to 10 cm$^{-1}$, 7 cm$^{-1}$ to 20 cm$^{-1}$, 7 cm$^{-1}$ to 19 cm$^{-1}$, 7 cm$^{-1}$ to 12 cm$^{-1}$, 7 cm$^{-1}$ to 10 cm$^{-1}$, 9 cm$^{-1}$ to 20 cm$^{-1}$, 9 cm$^{-1}$ to 19 cm$^{-1}$, or 9 cm$^{-1}$ to 12 cm$^{-1}$, including any range therebetween.

In some embodiments, controlling the lateral and temporal transmission of the probe beam comprises changing the crystal refractive index.

In some embodiments, the method is characterized by a negative change in the refractive index of the crystal. In some embodiments, the negative change in the refractive index is due to the free charge carrier density.

In some embodiments, the method is characterized by a spatial frequencies higher than the diffraction limited Gaussian shape PSF frequencies.

In some embodiments, the method is characterized by a penetration depth of the pump beam in the crystal surface between 1 nm and 100 µm, 5 nm and 100 µm, 10 nm and 100 µm, 20 nm and 100 µm, or 50 nm and 100 µm, 1 µm and 100 µm, 5 µm and 100 µm, 10 µm and 100 µm, 20 µm and 100 µm, or 50 µm and 100 µm, including any range therebetween.

In some embodiments, the increase of the free charge carriers (FCC) concentration decreases the real refractive index ($\Delta n$). In some embodiments, the increase of the free charge carriers (FCC) concentration increases the absorption ($\Delta \alpha$). In some embodiments, the decrease of $\Delta n$ and the increase of $\Delta \alpha$, block and/or disperse the IR beam in the silicon.

In some embodiments, the propagation of the pump light beam and the propagation of the probe light beam overlap in space. In some embodiments, the propagation of the pump light beam and the propagation of the probe light beam overlap in time. In some embodiments, projecting the pump light beam and the probe light beam is at the same time or different time intervals.

In some embodiments, the method is characterized by a narrowing and/or sharpening in the PSF of the probe beam.

In some embodiments, the use of a pump beam and a probe beam results in a narrower PSF of the probe beam by a factor of 2 to 100 when compared to the PSF of the probe beam without the use of the pump beam. In some embodiments, the use of a pump beam and a probe beam results in a narrower PSF of the probe beam by a factor of 2 to 90, 2 to 50, 2 to 30, 2 to 10, 2 to 9, 2 to 8, or 2 to 7, when compared to the PSF of the probe beam without the use of the pump beam, including any range therebetween.

In some embodiments, the point spread function (PSF) diameter of the pump beam is calculated according to the resolution (r) formula: r=$\lambda$/2NA, wherein NA refers to the objective numerical aperture, and is the imaging wavelength. In some embodiments, the doughnut shape beam diameter relates to the equation $\lambda$/2NA, wherein NA refers to the objective numerical aperture, and is the imaging wavelength.

Focusing Effect

In some embodiments, the present method is characterized by the focusing of the probe beam by the pump beam. In some embodiments, the method is characterized by the focusing of the probe beam by the doughnut shaped pump beam. This is possible by using a pump laser beam comprising a doughnut shape. In some embodiments, the doughnut shape is created by a vortex plate.

In some embodiments, the pump beam pulse creates a doughnut pattern of free charge carriers (FCC), in the crystals surface. In some embodiments, the pump beam pulse creates a doughnut pattern of free charge carriers (FCC), in the semiconductors surface. The second beam, the probe beam that is pulsed after the pulse of the pump beam meets the FCC doughnut pattern in the crystals surface and it is shaped by this pattern.

In some embodiments, the doughnut beam converges the probe beam light by blocking the periphery of the probe beam.

In some embodiments, a part of the probe beam point spread function (PSF) is blocked via absorption by the FCC density area of the doughnut. In some embodiments, a part of the probe beam PSF is focused towards the center of the doughnut. In some embodiments, a part of the probe beam PSF is defocused towards the outer area of the doughnut.

In some embodiments, the doughnut shaped beam converges the probe beam light by blocking the periphery of the probe beam. In some embodiments, the doughnut shaped pattern blocks the periphery of the probe beam and transmits a narrow probe beam signal in its center.

In some embodiments, the doughnut shaped beam creates a diffusion of the FCC towards the center of the doughnut which create a dynamic profile of index of refraction inside the doughnut and it acts as a Green lens that focuses the probe beam. In some embodiments, the shaping of the probe beam is controlled by controlling the time delay of the pump beam. In some embodiments, the shaping of the probe beam is controlled by controlling the doughnut diameter. In some embodiments, the shaping of the probe beam is controlled by controlling the time delay of the pump beam and the doughnut diameter. In some embodiments, controlling the time delay of the pump beam is between 20 fs and 2 ns, 20 fs and 1.5 ns, 20 fs and 1 ns, 20 fs and 0.1 ns, 10 fs and 1.5 ns, 10 fs and 1 ns, 10 fs and 0.1 ns, 1 fs and 1.5 ns, 1 fs and 1 ns, 1 fs and 0.1 ns, 0.5 fs and 1.5 ns, 0.5 fs and 1 ns, or 0.5 fs and 0.1 ns, including any range therebetween.

In some embodiments, controlling the lateral and temporal transmission of the probe beam comprises reducing the diffusion effect of the free-charge-carriers.

In some embodiments, the FCC density pattern is controlled by a vortex plate with a topological order of 0 to 8, 0 to 6, 0 to 4, or 0 to 3, including any range therebetween.

In some embodiments, the narrowing of the probe beam is controlled by controlling the topological order of the vortex plate.

In some embodiments, the diameter of the doughnut pump beam on the crystals surface is controlled by the distance from the pump beam focal point. In some embodiments, the diameter of the doughnut pump beam on the crystals surface is controlled by the change of the vortex's topological order. In some embodiments, the diameter of the doughnut pump beam on the crystals surface is controlled by the distance from the pump beam focal point and by the change of the vortex's topological order.

In some embodiments, the diameter of the doughnut pump beam on the semiconductors surface is controlled by the distance from the pump beam focal point. In some embodiments, the diameter of the doughnut pump beam on the semiconductors surface is controlled by the change of the vortex's topological order. In some embodiments, the diameter of the doughnut pump beam on the semiconductors surface is controlled by the distance from the pump beam focal point and by the change of the vortex's topological order.

In some embodiments, there is provided a method for use in contactless electrical measurements in semiconductors. In some embodiments, there is provided a method for use in contactless electrical measurements in silicon integrated circuits (IC).

In some embodiments, the method allows for measurements in in silicon integrated circuits (IC) under operation. In some embodiments, the method described herein can be used in semiconductor substrates with enough thickness to remove the heat during the operation. In some embodiments, the presented method allows for heat dissipation during operation.

One of skill in the art will appreciate that the order of the light beams may be altered in various embodiments and that the nomenclature "first light beam" and "second light beam" is used herein for ease of reference. In some embodiments, "first light beam" refers to a pump beam and "second light beam" refers to a probe beam.

The System

According to one aspect, there is provided a super resolution imaging system for obtaining an image in a crystal. In some embodiments, the system comprises a laser configured to project a pump beam and a probe beam collinearly into the crystals surface, a vortex phase plate positioned between the pump beam source and the crystal; and a control unit configured to control the shape of the pump beam, thereby controlling the lateral transmission of the probe beam. In some embodiments, the crystal comprises a semiconductor.

In some embodiments, the system comprises an objective. In some embodiments, the objective is positioned between the vortex phase plate and the crystal. In some embodiments, the vortex phase plate is positioned between the pump beam source and the objective. In some embodiments, the system comprises a vortex phase plate positioned between the pump beam source and the crystal, wherein the pump beam source and the crystal comprise an objective in between.

In some embodiments, the control unit is configured to control the shape of the pump beam. In some embodiments, the control unit is configured to control the shape of the free charge carriers (FCC), in the crystals surface, created by the pump beam. In some embodiments, the pump beam created a doughnut pattern. In some embodiments, the control unit is configured to control the diameter of the doughnut and the doughnut width.

In some embodiments, the control unit is configure to provide a predetermined beam pulse width and wavelength of the pump beam and the probe beam.

In some embodiments, the laser is configured to project a pump beam and a probe beam synchronized, with a tunable optical delay line, at 5 Hz to 500 kHz, 5 Hz to 250 kHz, 5 Hz to 150 kHz, 5 Hz to 100 kHz, 5 Hz to 500 Hz, 50 Hz to 250 kHz, 50 kHz to 500 kHz, 50 kHz to 250 kHz, 50 kHz to 150 kHz, 50 kHz to 100 kHz, 90 kHz to 500 kHz, 90 kHz to 250 kHz, 90 kHz to 150 kHz, 90 kHz to 100 kHz, 100 kHz to 500 kHz, 100 kHz to 250 kHz, or 100 kHz to 150 kHz, including any range therebetween.

In some embodiments, the pump beam is projected at 20000 (picosecond) ps to 20 femtosecond (fs), 20000 ps to 15 fs, 20000 ps to 10 fs, 20000 ps to 5 fs, 20000 ps to 1 fs, 1000 ps to 15 fs, 1000 ps to 10 fs, 1000 ps to 5 fs, 1000 ps to 1 fs, 500 ps to 15 fs, 500 ps to 10 fs, 500 ps to 5 fs, 500 ps to 1 fs, 10 ps to 15 fs, 10 ps to 10 fs, 10 ps to 5 fs, 10 ps to 1 fs, 1 ps to 15 fs, 1 ps to 10 fs, 1 ps to 5 fs, or 1 ps to 1 fs, pulse width, including any range therebetween.

In some embodiments, the probe beam is projected at 20000 ps to 20 fs, 20000 ps to 15 fs, 20000 ps to 10 fs, 20000 ps to 5 fs, 20000 ps to 1 fs, 1000 ps to 15 fs, 1000 ps to 10 fs, 1000 ps to 5 fs, 1000 ps to 1 fs, 500 ps to 15 fs, 500 ps to 10 fs, 500 ps to 5 fs, 500 ps to 1 fs, 10 ps to 15 fs, 10 ps to 10 fs, 10 ps to 5 fs, 10 ps to 1 fs, 1 ps to 15 fs, 1 ps to 10 fs, 1 ps to 5 fs, or 1 ps to 1 fs, pulse width, including any range therebetween.

In some embodiments, the pump beam and the probe beam are pulsed at a repetition rate between 5 pulses and 100,000 pulses per second, 10 pulses and 100,000 pulses per second, 30 pulses and 100,000 pulses per second, 50 pulses and 100,000 pulses per second, 100 pulses and 100,000 pulses per second, 500 pulses and 100,000 pulses per second, 1000 pulses and 100,000 pulses per second, or 10,000 pulses and 100,000 pulses per second, including any range therebetween.

In some embodiments, the laser is configured to project the probe beam at a wavelength ($\lambda$) between 1000 nm and 2000 nm, 1200 nm and 2000 nm, 1500 nm and 2000 nm, 1000 nm and 1900 nm, 1200 nm and 1900 nm, 1500 nm and 1900 nm, 1000 nm and 1600 nm, or 1200 nm and 1600 nm, including any range therebetween.

In some embodiments, the laser is configured to project the pump beam at a $\lambda$ below the absorption edge of the semiconductor. In some embodiments, the laser is configured to project the first beam at a $\lambda$ between 500 nm and 1000 nm, 500 nm and 900 nm, 600 nm and 1000 nm, 600 nm and 900 nm, 500 nm and 800 nm, or 600 nm and 800 nm, including any range therebetween.

In some embodiments, the pump beam and the probe beam originate from the same source. In some embodiments, the pump beam and the probe beam originate from a different source.

In some embodiments, the laser comprises s first laser and a second laser. In some embodiments, the pump beam is projected from a first laser and the probe beam is projected from a second laser.

In some embodiments, the pump beam and the probe beam are projected from a laser. In some embodiments, the laser projects a beam that is split into a probe beam and a pump beam.

In some embodiments, the semiconductor comprises silicon, germanium, gallium arsenide, cadmium, selenide, or any combination thereof.

In some embodiments, the control unit is configured to control the vortex phase plate topological order from 0 to 8, 0 to 6, 0 to 4, or 0 to 3, including any range therebetween.

In some embodiments, the control unit is configured to control the distance of the pump beam focal point.

In some embodiments, control the distance of the pump beam focal point is between 1 nm and 1 mm, 10 nm and 1 mm, 20 nm and 1 mm, 50 nm and 1 mm, 100 nm and 1 mm, 10 nm and 0.5 mm, 20 nm and 0.5 mm, 50 nm and 0.5 mm, 100 nm and 0.5 mm, 10 nm and 0.1 mm, 20 nm and 0.1 mm, or 50 nm and 0.1 mm, including any range therebetween.

In some embodiments, controlling the lateral and temporal transmission of the probe beam is controlling the probe beam point spread function (PSF). In some embodiments, a part of the probe beam PSF is blocked via absorption by the FCC density area of the doughnut. In some embodiments, a part of the probe beam PSF is focused towards the center of the doughnut. In some embodiments, a part of the probe beam PSF is defocused towards the outer area of the doughnut.

In some embodiments, the doughnut beam converges the probe beam light by blocking the periphery of the probe beam. In some embodiments, the doughnut shaped pattern blocks the periphery of the probe beam and transmits a narrow probe beam signal in its center.

In some embodiments, controlling the lateral and temporal transmission of the probe beam comprises reducing the diffusion effect of the free-charge-carriers.

In some embodiments, there is provided an imaging system as described herein. In some embodiments, the imaging system further comprises a plurality of optical elements, an imager, a memory, a processor, or any combination thereof.

Figure 12:
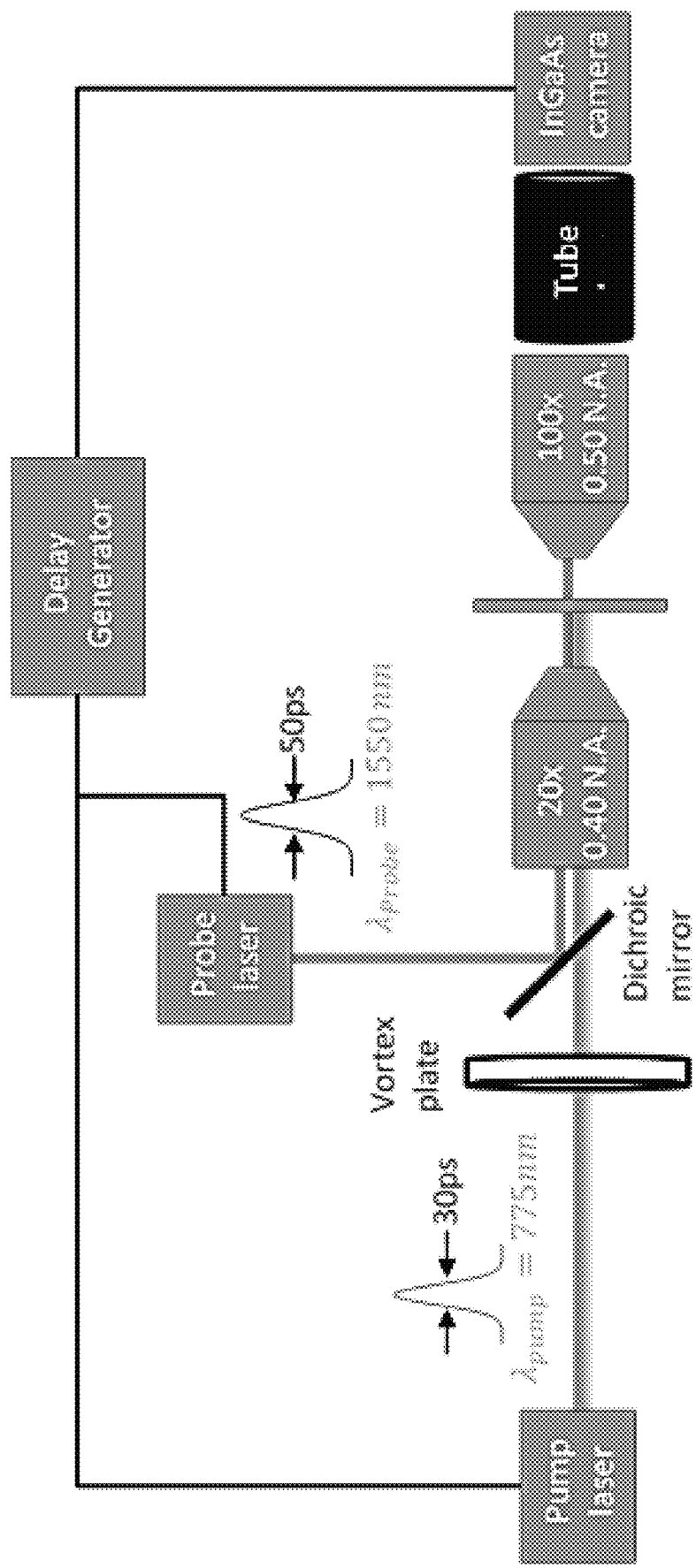
FIG. 12 presents a schematic representation of a non-limiting exemplary experimental setup with a vortex plate, according to the present invention.

FIG. 12 illustrates an exemplary imaging system according to some embodiments described herein. Various other imaging systems may be used and/or the imaging system of FIG. 12 may include any number of additional and/or alternative components. In some embodiments, some components described in FIG. 12 may be removed and components added. In some embodiments, some components can be exchanged for other components. In some embodiments, all or portions of FIG. 12 may be part of a conventional imaging system. In some embodiments, all or portions of FIG. 12 may be part of a super resolution imaging system.

Optionally, the disclosed system further comprises a computer program product. Optionally, the control unit comprises a computer program product. Optionally, the program code is excusable by a hardware processor. Optionally, the hardware processor is a part of the control unit.

Optionally, the computer program product comprises a computer-readable storage medium. The computer-readable storage medium may have program code embodied therewith. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to drawings and/or diagrams of methods, apparatus (systems), and computer program products according to embodiments of the invention. It will be understood that each illustration and/or drawing, and combinations thereof, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the drawings. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the drawings.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the drawings.

General

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Plasma Dispersion Effect Based Super-Resolved Imaging in Silicon

The Concept

Figure 1A:
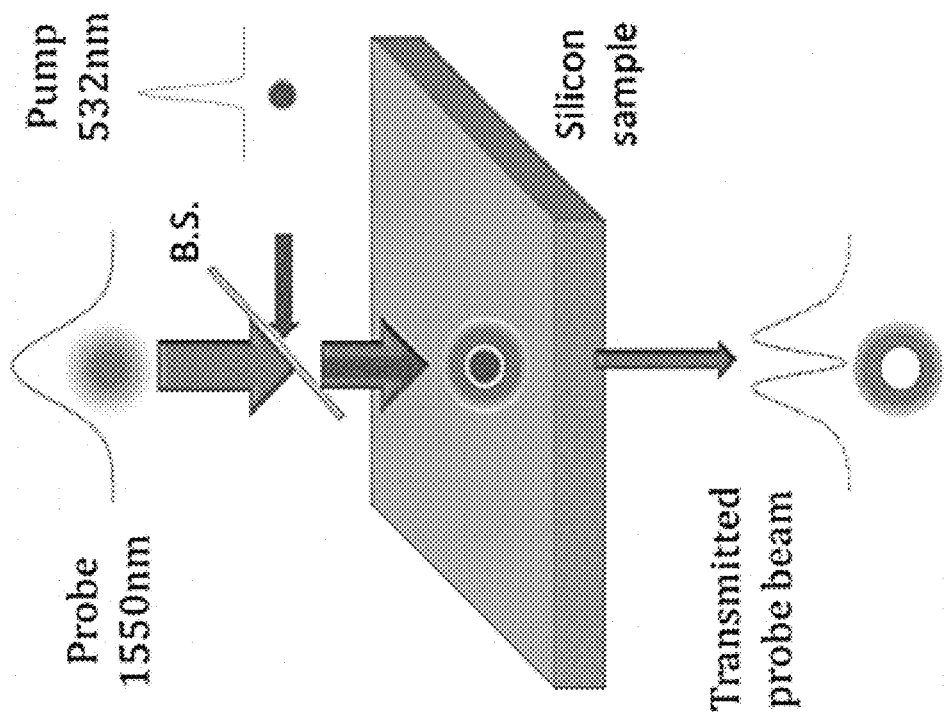

The presented method is based upon the plasma dispersion effect (PDE) in silicon. Infrared (IR) laser beam in silicon can be shaped by changing the silicon complex refractive index locally via another laser beam absorbed in the silicon which acts as a pump. This change is induced by the change in the free charge carriers (FCC) density in the silicon due to the absorbed pump beam. In this method, spatial frequencies higher than the ordinary diffraction limited Gaussian shape point spread function (PSF) frequencies are induced. It is important to note that the proposed mechanism is non-linear because the absorption coefficient for the probe is proportional to the power of the pump therefore the total absorption of the probe is exponentially related to the absorption coefficient according to the Beer-Lambert law. Thus, the intensity of the probe is exponentially dependent on the intensity of the pump. The result of this technique is the improvement in the PSF of the IR beam. The shaping of the IR beam PSF can be done in two modes. The first mode is to induce a hole in its center by applying a narrower Gaussian pump beam on its center (FIG. 1A). In this mode the resolution can easily be improved by factor higher then 3, which is the ratio of probe to pump wavelengths and improved further towards the sub-wavelength regime due to the non-linearity of the plasma dispersion effect (PDE). In this case the PSF has a shape requiring post processing (decoding) in order to reconstruct the super-resolved image. The second mode is to apply a donut shape pump beam to leave a narrow part on the center of the IR beam to pass through, and the rest of the beam blocked (FIG. 1B). In both modes the same absorption mechanism is involved. Therefore, the inventors expected induce of high spatial frequencies in both modes which would be reflected in the nano scales. The second mode has the advantage to determine the diameter of the inner hole of the donut by manipulation of the diffusion of the FCC. In previous works the inventors developed an all-optical silicon slab modulator for temporal modulation of an IR laser probe beam by a second pulsed green laser beam as a pump. The pump laser was absorbed in the silicon and generated FCC that block the IR probe beam via the PDE. The ability to block IR beam in silicon by induced FCC absorption, temporally and spatially, gives the basis for super-resolution imaging method in silicon as proposed.

Theory

The physical mechanism the inventors used for the modification of the silicon refractive index is the PDE, in which a change in the concentration of the FCC in the silicon modifies its complex refractive index. The complex refractive index may be written as n=n+ik where the real part is the conventional index of refraction n. The imaginary part k is the optical extinction coefficient and it is related to the absorption coefficient α, by the Eq. k=αΔ/4π. The PDE change of the real refractive index Δn, and the absorption coefficient, Δα, can be predicted in good approximation by the free-carrier theory (Drude model). For c-Si and probe beam at wavelength λ=1550 nm Soref and Bennet extracted empirical formulas for Δn and Δα (cm$^{-1}$) as a function of the electron and holes concentration $\Delta N_e$ (cm$^{-3}$) and $\Delta N_h$ (cm$^{-3}$), respectively.

$$\Delta n = -8.8 \cdot 10^{-22} \cdot \Delta N_e - 8.5 \cdot 10^{-18} \cdot \Delta N_h^{0.8} \quad (1)$$

$$\Delta\alpha = 8.5 \cdot 10^{-18} \cdot \Delta N_e + 6.0 \cdot 10^{-18} \cdot \Delta N_h \quad (2)$$

In our experiment the electron and holes concentration are generated by the pump laser beam where each photon creates an e-h pair. According to Eqs. (1) and (2) the increase in the FCC concentration causes a decrease in the real refractive index Δn, and an increase in the absorption Δα, which blocks the IR beam in the silicon.

Experimental Results

FIG. 1A presents an illustration of the experiment performed, as a proof of concept, for the proposed method. A silicon slab is illuminated by two pulsed diffraction limited Gaussian laser beams, a pump beam at wavelength of 532 nm and a probe beam at 1550 nm. The two beams are collinear and synchronized. The 532 nm beam width is narrower than the 1550 nm beam. The 532 nm beam is absorbed in the silicon and blocks the center of the 1550 nm beam to induce a hole in its center. The absorbed 532 nm beam pulse generates FCC that causes a temporary change in the complex refractive index of the silicon due to PDE.

The change in the real and imaginary refractive index, as given in Eqs. (1) and (2), results in small phase and absorption changes. The sample used was an intrinsic C—Si slab with resistivity ρ>1,000 Ω·cm, 470 μm thick and area of 20×20 mm$^2$, optically polished on both sides in parallel and without coating. Due to the high silicon's index of refraction, n=3.5, it acts as a Fabry-Pérot (FP) resonator with spectral transmission (peak to valley) varying by factor of ~2 for the probe laser. The spectral transmission of the same sample taken with a scanning wavelength CW laser, shows peak to valley ratio of 3 as expected for uncoated silicon.

Figure 2:
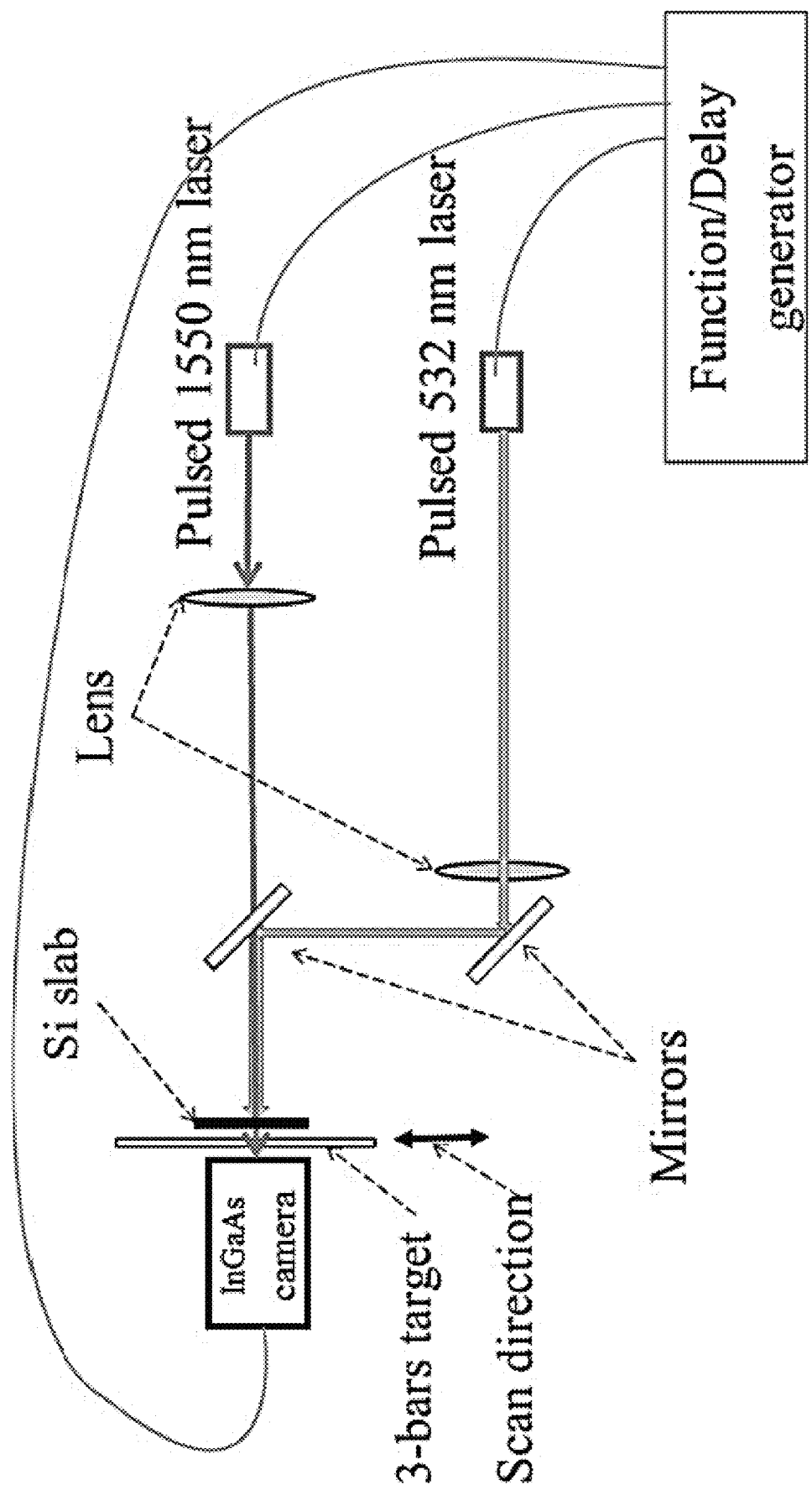
FIG. 2 presents a schematic representation of an non-limiting exemplary experimental setup according to the present invention.

The experimental setup used is shown in FIG. 2. The probe laser is ~50 ps pulse width with jitter <25 ps and beam diameter (1/e$^2$) of 1200 μm. The pump laser is 17 ns pulse width with jitter <4 ns and the beam focused to diameter of ~30 μm on the silicon, as measured by a laser beam analyzer.

Figure 3A:
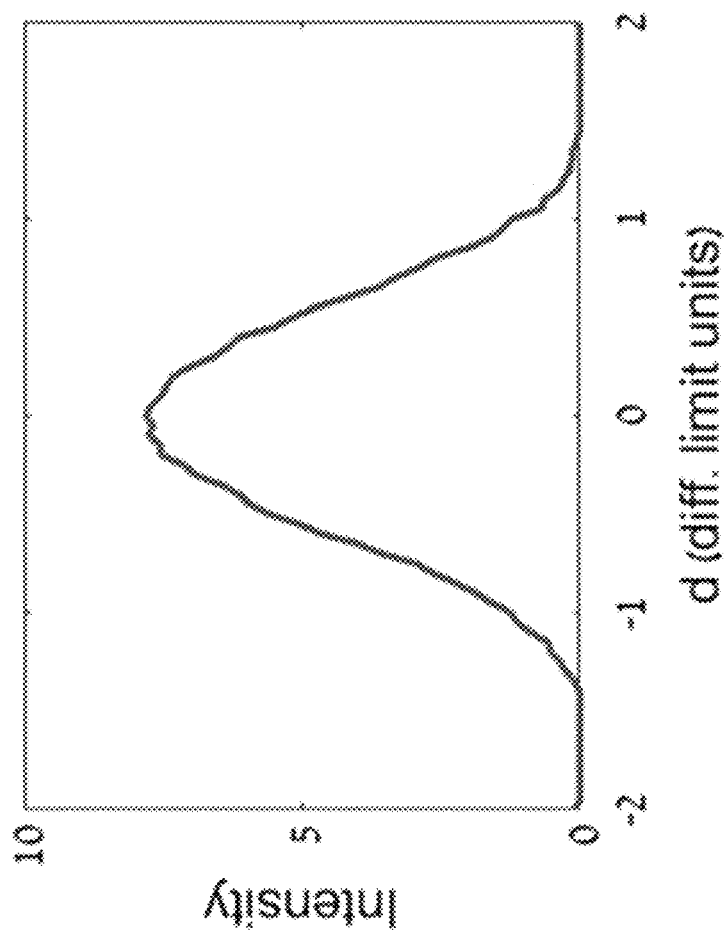
FIGS. 3A-B present an image of the transmitted probe laser beam, in silicon, with its profile without the pump laser (FIG. 3A) and an image of the transmitted probe laser beam shaped by the pump beam superimposed on it to create a dip in its center (FIG. 3B)
Figure 3A:
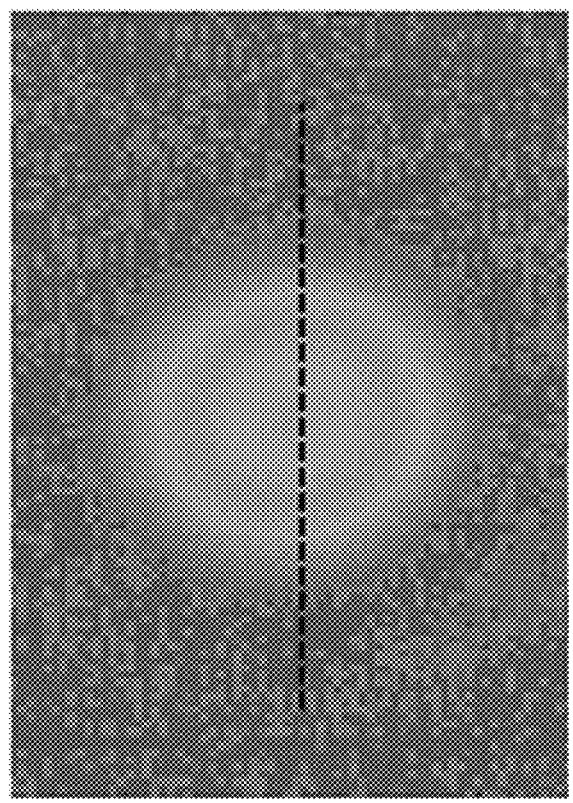

The experiment was done where the probe and the pump lasers were focused on the silicon surface collinearly and pulsed simultaneously at a repetition rate of 10 pulses per second. The images of the transmitted probe laser beam were taken by InGaAs camera. Image of the transmitted probe laser beam without the pump laser is given in FIG. 3A.

Figure 3B:
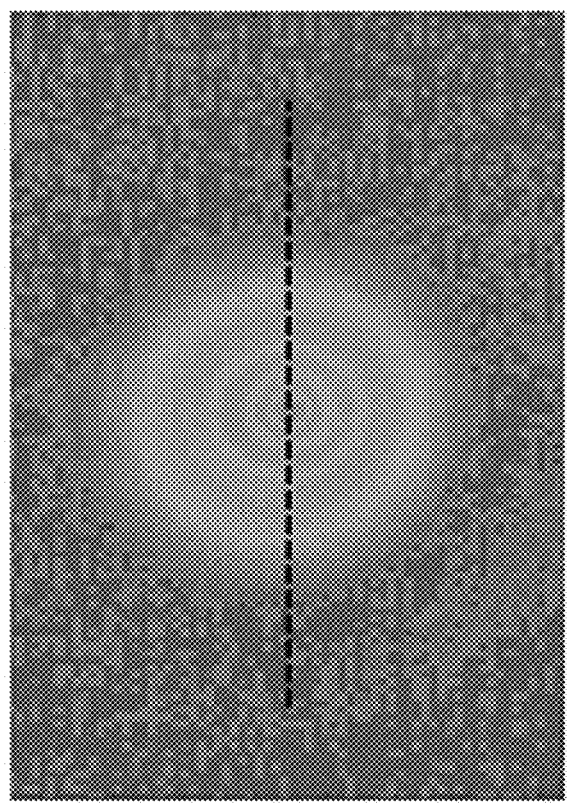
Figure 3B:
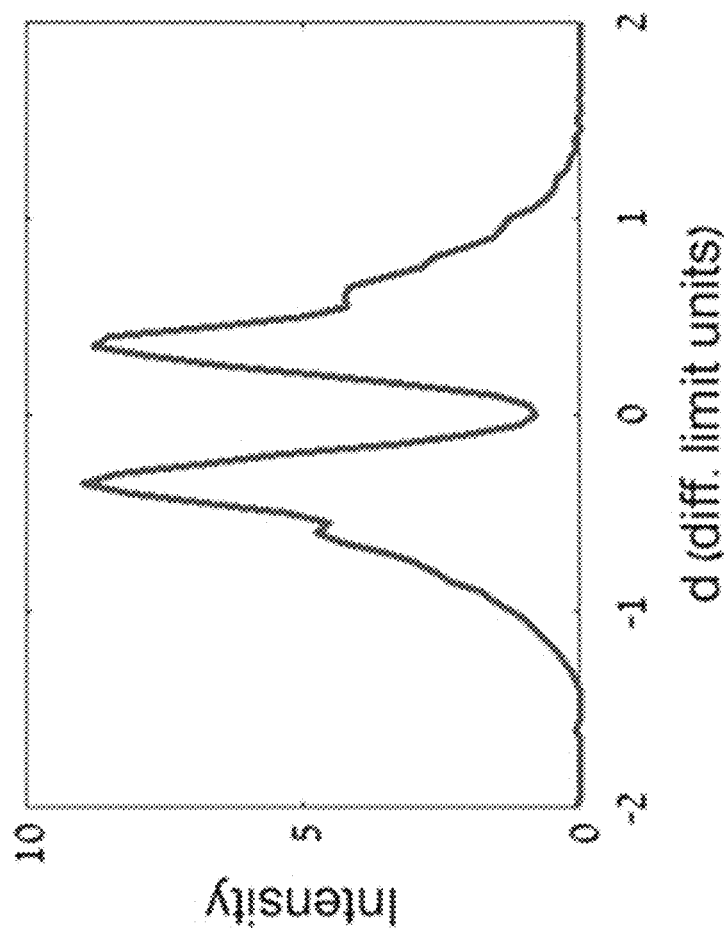

In FIG. 3B, the probe is shown with the pump laser applied on its center demonstrating a beautiful dip in the center of the probe Gaussian beam.

Figures 4A, 4B:
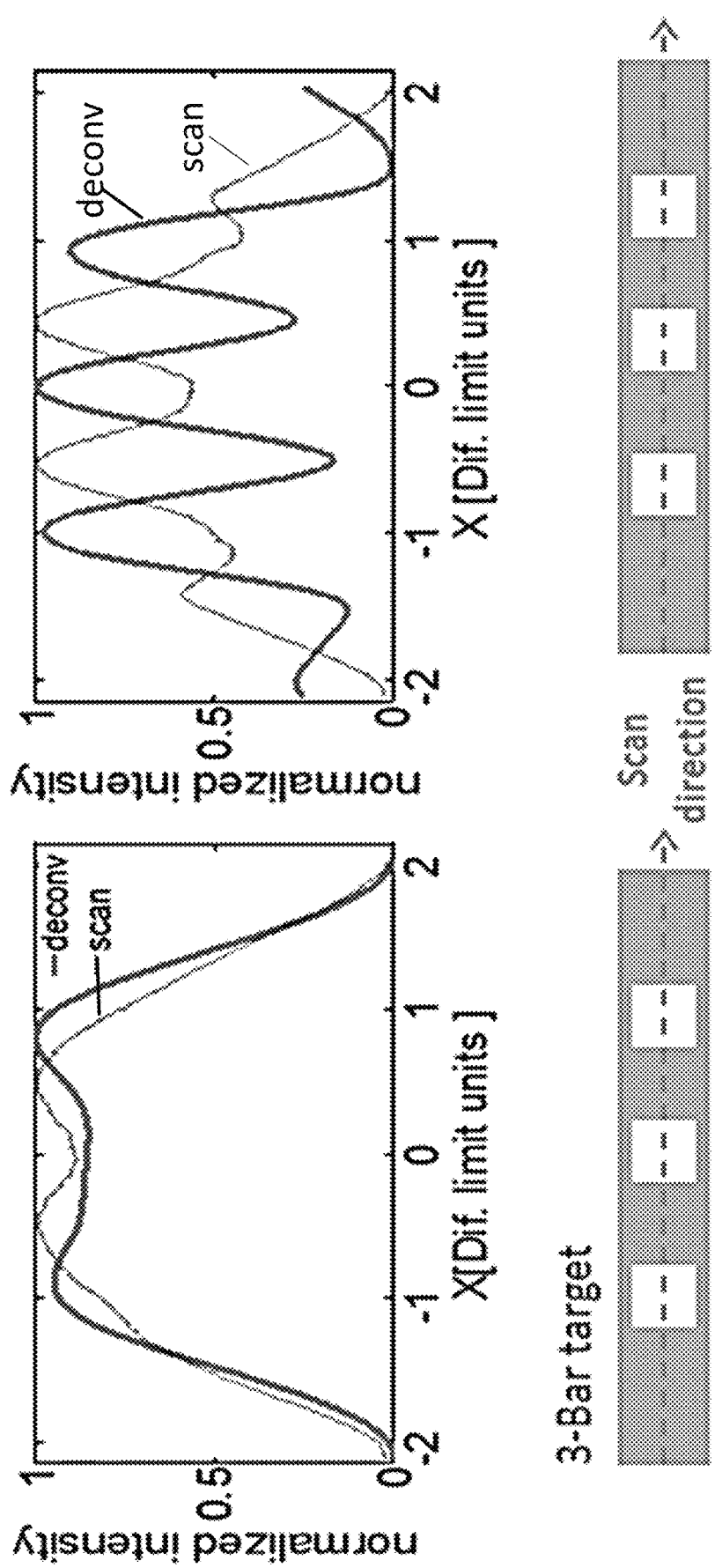
FIGS. 4A-B present the probe Gaussian IR laser beam at the diffraction limit scan across a 3-bars target (with a period of 500 µm) in two cases: without the pump beam, as in FIG. 3A, which shows unresolved target (FIG. 4A), and a scan of the target with the pump beam, with the dip in it, showing super-resolution where the target is well resolved (FIG. 4B); The "scan" lines are the direct scan results and the "deconv" lines are the direct scan results deconvoluted with the probe beam.

In the attached visualization the inventors show that the dip in the probe laser Gaussian beam appears only where the pump laser beam is co linear in space and synchronized with it in time. First, the inventors moved the pump laser beam in and out of the probe beam. Second, the inventors changed the delay time between the lasers pulses in steps of 10 ns and show that the effect completely disappeared in delay of 20 ns, even though the two lasers pulses are applied collinearly on the silicon continuously. In the video it can be seen, how fast is the PDE in silicon where in the delay of 10 ns the depth of the dip vibrates because of the jitter in the pump laser pulses. In FIGS. 4A-B the inventors demonstrate the break of the diffraction limit, by the shaped beam of FIG. 3B, in comparison with the unshaped beam of FIG. 3A. The experiment was conducted on a 3-bars target, with a period of 500 μm, scanned by the probe laser beam. The IR beam focused on Si surface with a very low NA (one diffraction limit unit is 600 μm), and the camera was without a lens (see FIG. 2). The experimental scan results of the 3-bars target using the unshaped beam are shown in FIG. 4A, and for the shaped beam in FIG. 4B. Knowing the beam PSF, the inventors used MATLAB software to perform a standard Wiener filter algorithm to DE-convolute the raw scan. The scan with the unshaped probe beam, FIG. 4A shows unresolved pattern. On the other hand FIG. 4B shows clear resolution result of a scan with the shaped beam (the same beam shown in FIG. 3B. In this experiment the super resolution is demonstrated by the use of the shaped beam.

Figures 5A, 5B:
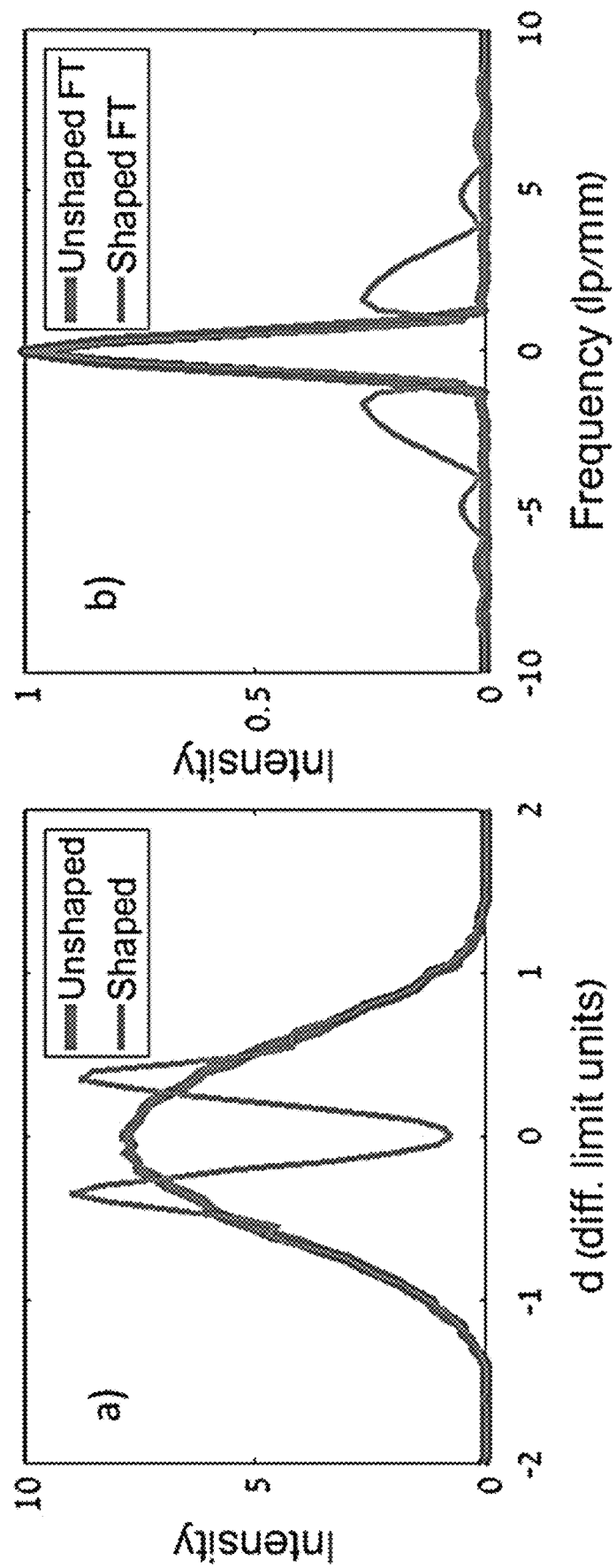
FIGS. 5A-B present the resolution enhancement in the spectral response of the shaped beam (thick trace) compared with the unshaped (thin trace) probe beam: shaped and the unshaped beams (FIG. 5A) and its Fourier transform (FT) shows increase in the special frequencies (FIG. 5B)

In FIGS. 5A-B the inventors also, demonstrate the resolution enhancement in the spectral response of the shaped beam compared with the unshaped probe beam. Where the shaped and the unshaped beams are shown in FIG. 5A and its Fourier transform (FT) are shown in FIG. 5B.

Figure 6A:
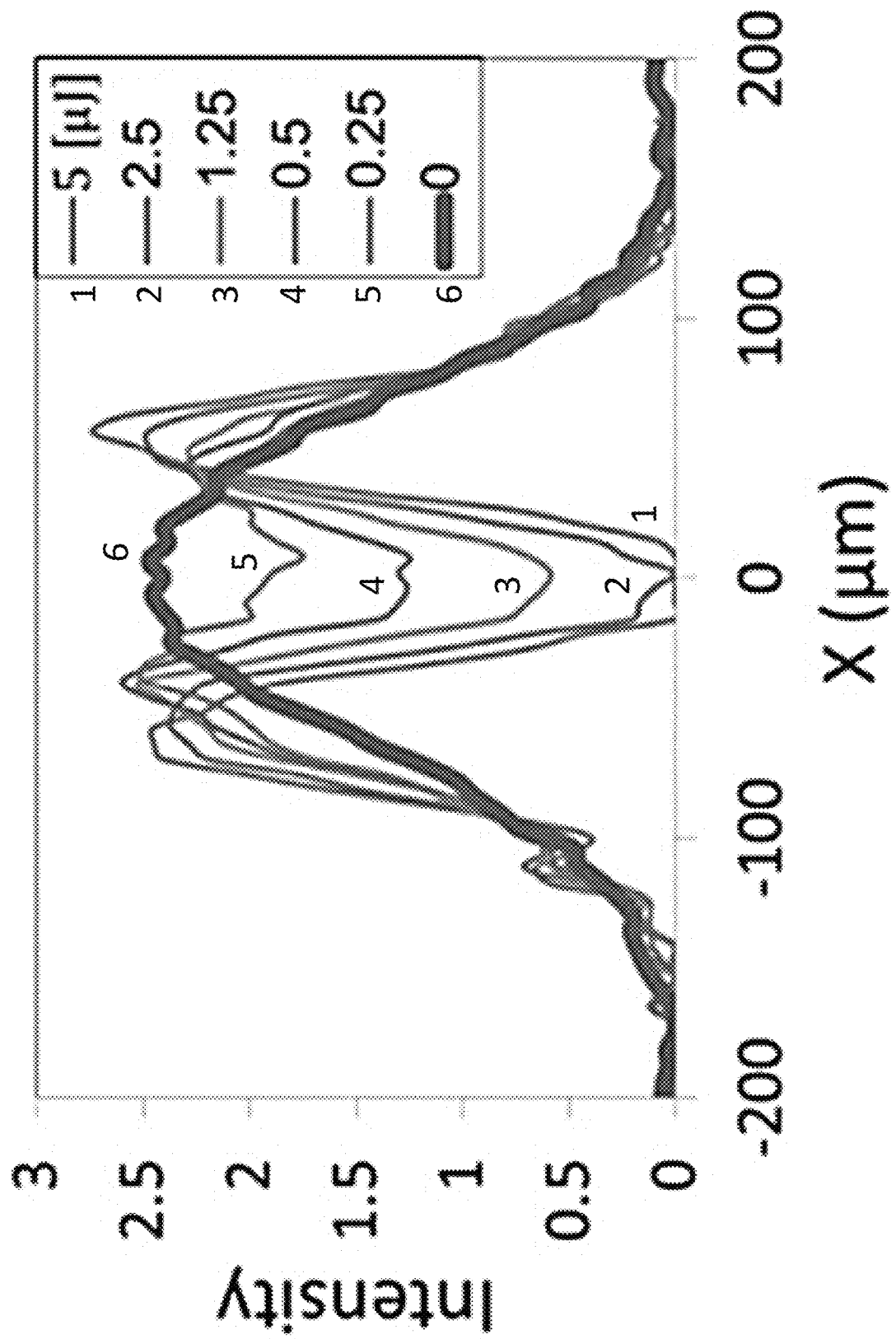
FIGS. 6A-B present graphs of the dip depth as a function of pump pulse energy: the profiles of the probe beam—without pump (6) and with different 5 pump pulse intensities (1-5) (FIG. 6A) and the dip depth as a function of the pump laser pulse energy—experimental (circles), calculations via the PDE+FP (dashed line), and calculation of FCC absorption only (line) (FIG. 6B)

As one can see in FIG. 3B, the dip in the probe Gaussian is not complete and it reduces the sharpness of the 3-bars scan pattern. The shaped probe beam in FIG. 3B was taken by the camera without its lens; the transmitted probe beam was imaged on the camera's plan array detector directly from a distance of ~20 mm. However, when the camera with a zoom lens focused on the front surface of the silicon, at the point where the two beams are focused on, the inventors observed a full dip in the probe beam, as shown in FIG. 6A, at pulse energy of 2.5 μJ. The dip depths as a function of the pump laser beam intensity are given in FIG. 6B. The experimental results of the dips depth are shown in FIG. 6A where the number 6 Gaussian is the probe beam only. The traces 5-1 and attribute to the probe beam being superimposed with the pump beam pulses with energies of 0.2, 0.5, 1.25, 2.5, 5 μJ respectively. In FIG. 6A the inventors show profile trace of 5 energy values out of 18 that were measured in the experiment. The dip depth at each energy measured from the bottom of the dip on each trace to the peak of the black Gaussian.

Figure 6B:
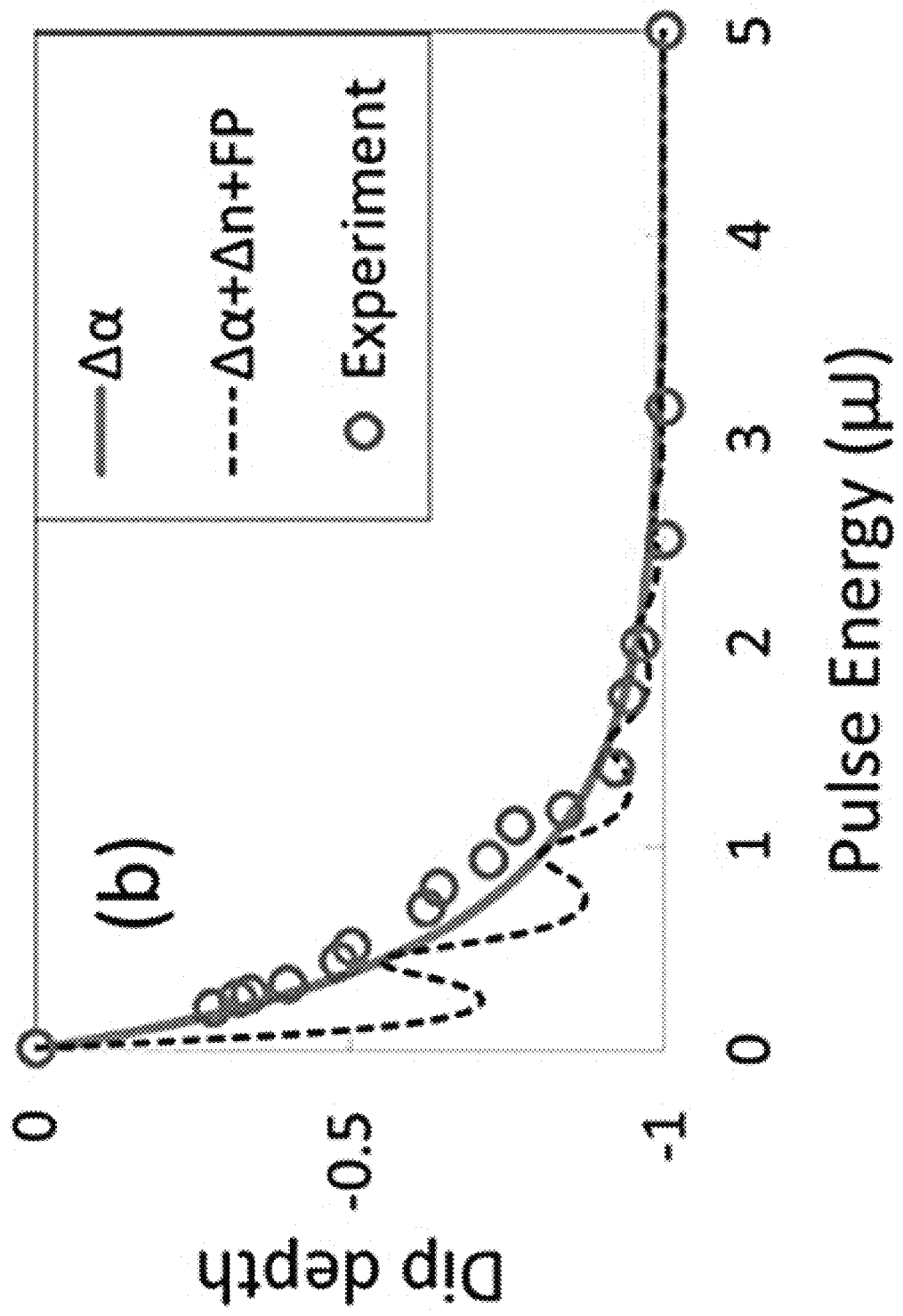

The fit line in FIG. 6B is based on the following Eq. which includes the FB and the PDE:

$$\frac{I_{out}}{I_{in}} = \frac{(1-R)^2 e^{-(\Delta\alpha)d}}{\left(1 - \mathrm{Re}^{-(\Delta\alpha)d}\right)^2 + 4R \cdot e^{-(\Delta\alpha)d} \cdot \sin^2\left(\frac{2\pi(n \cdot L + \Delta n \cdot d)}{\lambda}\right)} \quad (3)$$

Where R is the reflectivity of FP planes from both sides of the slab, Δα and n are the Si absorption coefficient and refractive index, respectively, $\lambda$ is the probe wavelength, d is the absorption depth+diffusion length and L is the silicon sample thickness. The intensity of the pulse is introduced by $\Delta\alpha$ and $\Delta n$ through the increase in the FCC density, derived by Eqs. (1) and (2).

Discussion

The dip depths in the probe beam as a function of the pump pulse energy are given in FIGS. 6A-B. The figure shows beautiful fit with the calculated values assuming FCC absorption, 100 ns and it does not affect the FCC concentration during the pump pulse duration. The maximum flounce used was 0.2 J/cm$^2$ which is lower by a factor of ~10 than the damage threshold for silicon. Under the above assumptions, this flounce intensity for the pump beam creates FCC density of ~10$^{20}$ l/cm$^3$.

Figure 7B:
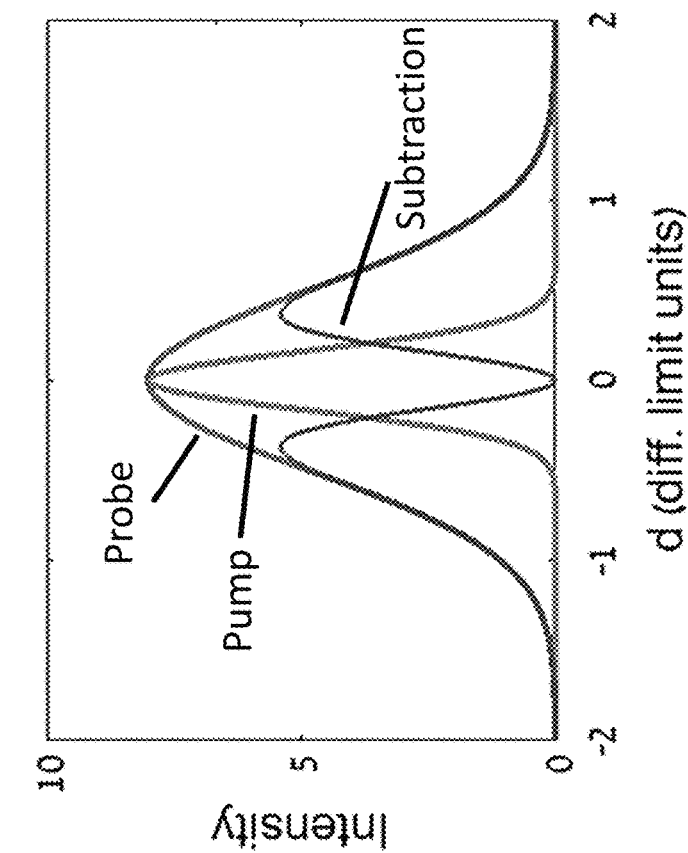
FIGS. 7A-B present graphs of the defocusing observed in the experiment compared to simple subtraction of a narrow Gaussian from a wider one: the probe beam in the experiment, without the pump beam ("unshaped" line) and with the pump beam ("shaped" line) (FIG. 7A) and mathematical subtraction ("subtraction" line) of pump ("pump" line) Gaussians from probe ("probe" line) Gaussian (FIG. 7B)
Figure 7A:
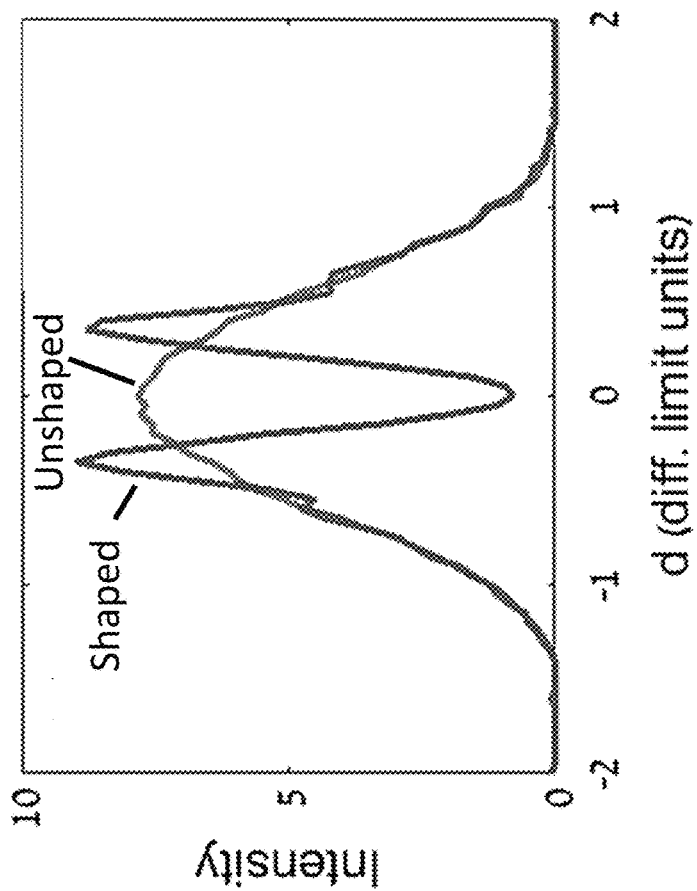

Another interesting effect the inventors saw is the defocusing. From FIG. 3B and FIG. 6A it can be seen that the rim of the dip in the shaped beam is brighter than the pick of the original probe Gaussian beam. This is not expected for a subtraction of two Gaussians as shown in FIG. 7B. According to PDE, the inventors attribute this effect to the defocusing of the probe beam due to negative change in the index of refraction of the silicon due to the pump beam. The shape of the dip is governed by the Gaussian shape of the pump beam which creates on the silicon an area of Gaussian distribution of FCC in shape similar to the pump beam shape, i.e. high concentration in the center and lower in its periphery. Since the PDE is a nonlinear effect the block of the probe beam is significantly stronger in the center rather than on its periphery. However, the lower FCC concentration in the periphery still slightly reduces the silicon index of refraction and causes defocusing of the probe beam. Thus, another major novelty of this method is that the inventors can get a focusing from this defocusing effect if the inventors use a donut shape for the pump beam, instead of the Gaussian beam, as shown in FIG. 1B. The usage of donut shape for the pump beam will resemble the STED method in laser scanning fluorescence nanoscopy, but with completely different physical mechanism.

Figure 8B:
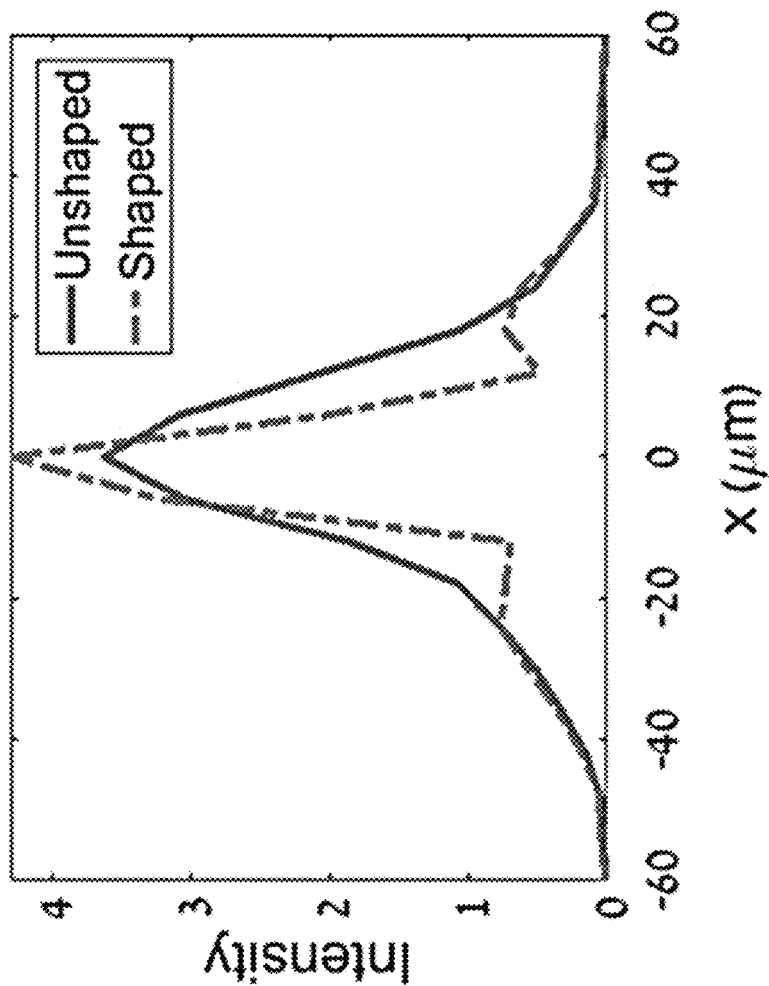
FIGS. 8A-B present the results of "Silicon Photonics STED" experiment: the donut shape pump beam (FIG. 8A) and the probe beam with (dashed line) and without (line) the donut pump on it (FIG. 8B)
Figure 8A:
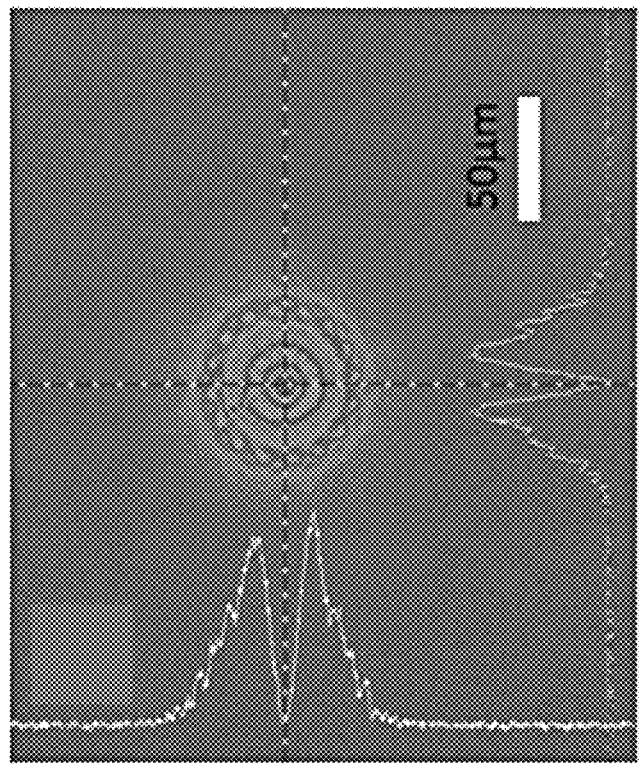

FIGS. 8A-B show preliminary experimental results for the shaping of the IR beam PSF by a donut pump beam. The donut shape for the pump beam was generated by spiral phase plate (Vortex plate) inserted at the output of the pump laser. It can be seen in FIG. 8B that the modulation depth of the shaped beam is not full, even for the pump pulse fluency the inventors had. The inventors tried to increase the flounce of the pump pulse by more focusing but because of the FCC diffusion toward the center of the donut at the pump pulse duration (17 ns), the IR shaped beam was blurred.

Conclusion

The inventors have demonstrated a proof of concept for the SPS. The inventors demonstrate the IR beam shaping by a second pump beam absorbed in the silicon via the PDE and show super resolution in silicon. This new method gives the ability to probe the silicon under surface in super resolution. It may serve as a very important tool in the field of nano electronics such as ICs failure analysis. It can also serve for detection of nano defects in silicon wafers, optical sensing of programmed charges in ICs and presumably it can be applied in other semiconductors. By the use of pump beam in longer wavelengths, closer to the absorption edge of the silicon, where the penetration depth of the pump beam can be increased up to ~100 μm under the silicon surface. The recombination time of photo-charges can also be measured precisely and directly by this method.

Example 2

Laser Induced Focusing for Super-Resolved Imaging in Silicon

The Concept

Figure 9:
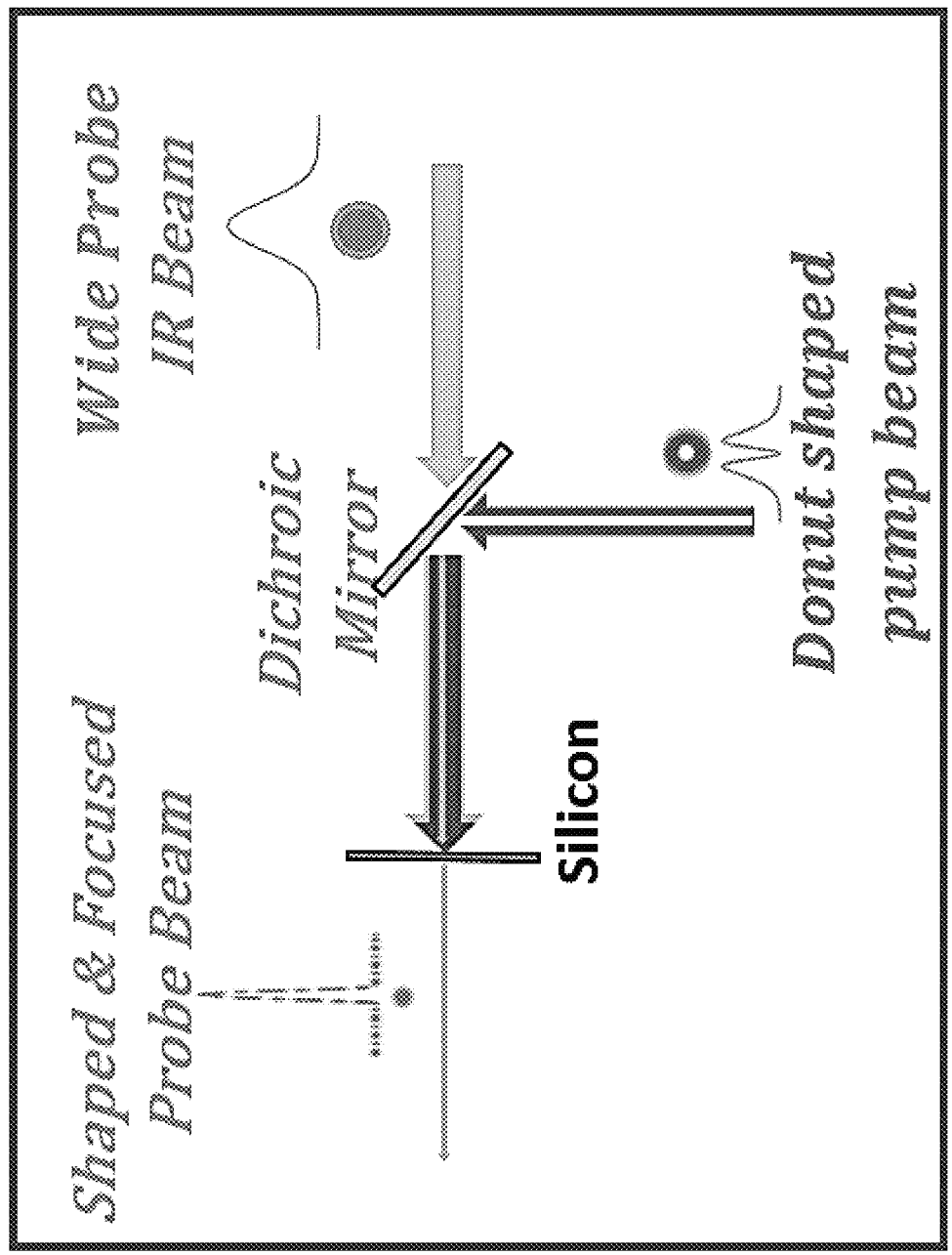
FIG. 9 presents a schematic representation of the concept of the beam shaping method: a donut shape pump beam blocks the periphery of the IR beam Gaussian and transmits a narrow beam focused in its center.
Figure 10B:
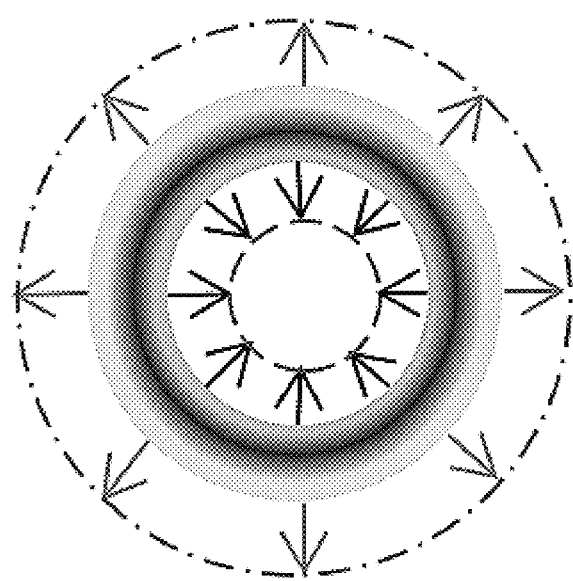
FIGS. 10A-B present illustrations of the donut pattern of the FCC exited by the donut shaped pump beam on the silicon (FIG. 10A), in the insert is given the distribution of FCC density across the donut, and in FIG. 10B are given the directions of the FCC diffusion—out of the donut will defocus the part of the probe that outside the donut, and toward the donut center will focus the part of the probe beam enclosed in inner part of the donut towards the center. The two beams are collinear with optical axis in perpendicular to the page.
Figure 10A:
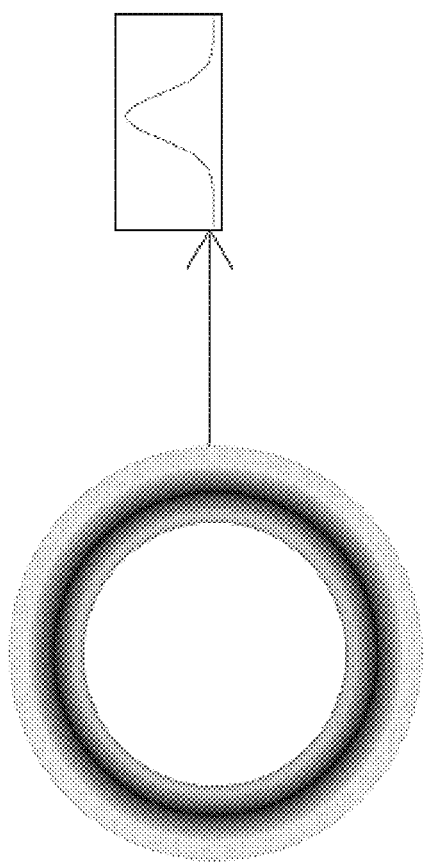
Figure 11B:
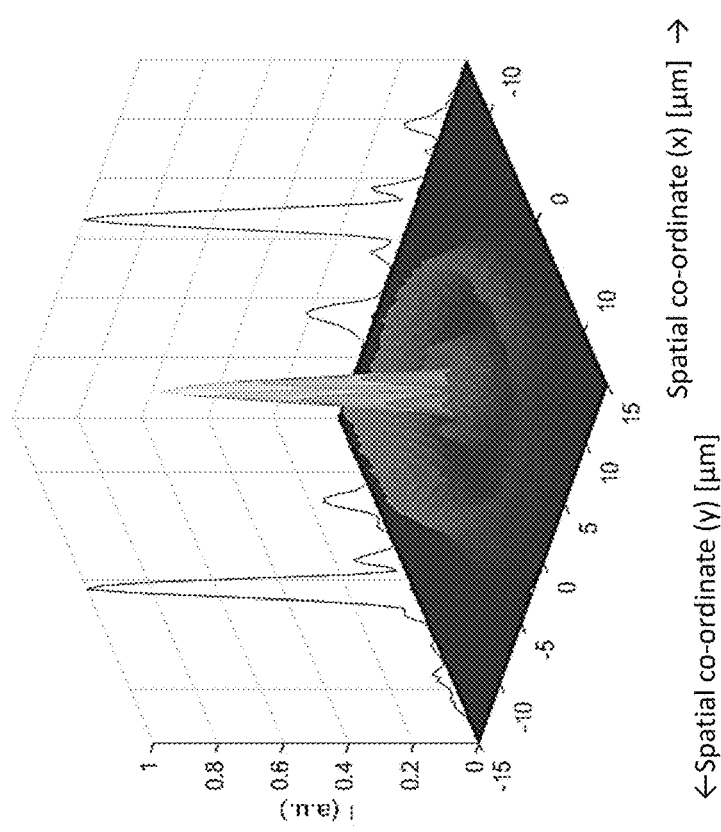
FIGS. 11A-B present images of the transmitted probe beam through the silicon demonstrating focusing and defocusing—experimental example taken by InGaAs camera. The probe gaussian PSF without pump (FIG. 11A), and the probe beam PSF with the pump beam applied on it in (FIG. 11B). The trace of the donut pump beam spot on the silicon, can be seen clearly in FIG. 11B as a circle groove of ~5 µm radius that blocks the pump completely, inside it is the focused and outside of it is the defocused part of the probe beam. The practical result, in this case, is a narrower PSF probe spot by factor of ~7 and higher by factor of 2.
Figure 11A:
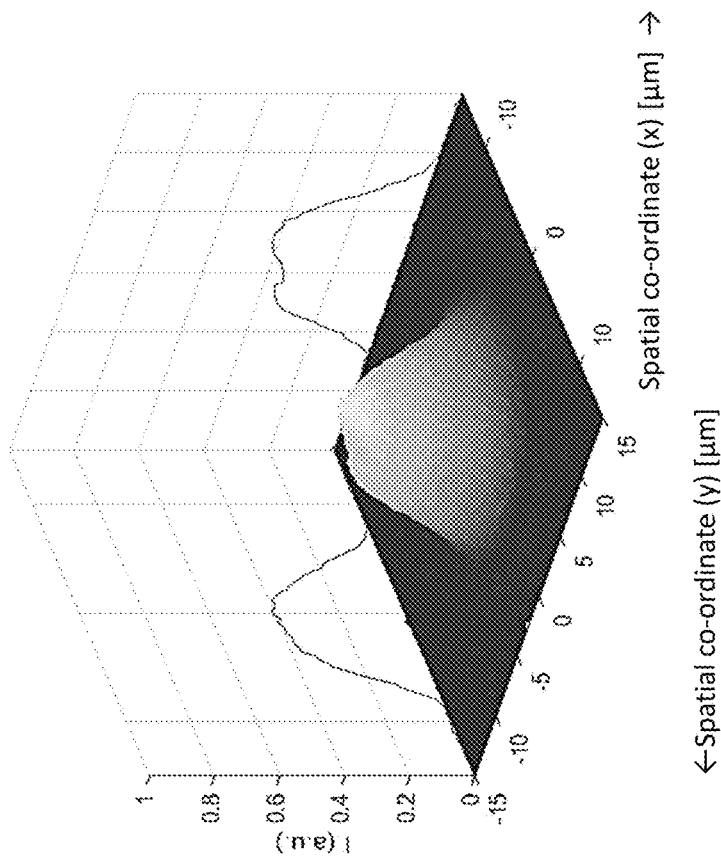

The presented method is based on the PDE in silicon. An IR laser beam pulses in silicon can be shaped by changing the silicon complex refractive index locally and temporally, via a second laser beam pulses absorbed in the silicon which acts as a pump. This change is induced by the change in the FCC density in the silicon due to the absorbed pump beam, where each absorbed photon creates one electron-hole pair. The result of this technique is narrowing or sharpening in the PSF of the IR beam. Therefore, spatial frequencies higher than the ordinary diffraction limited Gaussian shape PSF frequencies are induced in a similar way as it done in STED microscopy, but of course, by completely different physical mechanism. The idea of the IR beam shaping the inventors proposed, based on the use of a donut shape for the pump laser as shown in FIG. 9. The IR probe laser pulse hits the silicon surface, collinearly and simultaneously, with the donut shaped pump laser pulse. The pump pulse creates a donut pattern of FCC, in its spot dimensions at the first ~0.5 ns (see FIG. 10A). The probe beam that comes after the launch of the pump pulse, meets the FCC donut in the silicon and shaped by it as followed. Part of the probe beam PSF blocked (via absorption) by the higher FCC density area of the donut and the rest of it dispersed radially in two directions—focused towards the donut center and—defocused out of it, as clearly shown experimentally in FIG. 11B. In order to allow the control of the dynamics of the FCC in high resolution time scale, the pulse width the inventors use for the pump beam is 30 ps and 50 ps for the probe beam. In FIG. 10B is shown, the dynamics of the FCC donut pattern towards its surrounding in the silicon by diffusion, and according to PDE the index of refraction has the same dynamics. Therefore, the hole in the FCC donut pattern acts as a dynamic Green lens that its index of refraction can be manipulated by two parameters. First, the diameter of the donut pump beam on the sample that can be manipulated by the distance from the pump beam focal point and/or by the change of the vortex's topological order. Second, by the diffusion dynamics of the FCC pattern toward its center. According the PDE the profile of the induced index of refraction in the silicon is identical to the profile of the FCC created by the pump beam. This profile is dynamic due to the diffusion of the FCC from high concentration area at the impact point of the pump beam, to its surrounding on the silicon. This dynamic can be monitored by sequentially probing with the probe pulse in a proper time delay from the pump pulse application.

Theory

The physical mechanism we use for the modification of the silicon refractive index is the PDE, in which a change in the concentration of the FCC in the silicon modifies its complex refractive index. The complex refractive index may be written as n=n+ik where the real part is the conventional index of refraction n. The imaginary part k is the optical extinction coefficient and it is related to the absorption coefficient $\alpha$, by the equation k=$\alpha\lambda/4\pi$. The PDE change of the real refractive index $\Delta n$, and the absorption coefficient, $\Delta\alpha$, can be predicted by the free-carrier theory (Drude model). For c-Si and probe beam at wavelength $\lambda$=1550 nm, Soref and Bennet extracted empirical formulas for $\Delta n$ and $\Delta\alpha$ as a function of the electron and holes concentration $\Delta N_e$ and $\Delta N_h$ respectively.

$$\Delta n = -8.8\cdot 10^{-22}\cdot \Delta N_e - 8.5\cdot 10^{-18}\cdot \Delta N_h^{0.8} \quad (1)$$

$$\Delta\alpha = 8.5\cdot 10^{-18}\cdot \Delta N_e + 6.0\cdot 10^{-18}\cdot \Delta N_h \quad (2)$$

From equation (1) one can see that the index of refraction, n, decreases by the increase of the FCC concentration almost in the same manner for both $\Delta N_e$ and $\Delta N_h$. While, from equation (2) one can see that the absorption coefficient, $\alpha$, increases by the increase of the FCC concentration almost in the same manner for both $\Delta N_e$ and $\Delta N_h$. In our experiment we use an intrinsic c-Si and the electron and holes concentration are generated, temporally by the pump laser pulses where each photon creates an e-h pair.

The FCC are dynamic and after it create by the pump pulse, as mention before, they diffuse in two ways—freely radially out of the donut and in parallel radially towards the donut center. According the PDE the FCC dynamics creates, inside the donut, a green lens with dynamic profile for the index of refraction.

In FIG. 12 it can be seen the schematic representation of the experimental setup with a vortex plate.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A super resolution imaging method for obtaining an image in a crystal, the method comprising:
   i. providing a crystal;
   ii. projecting:
   a pump beam comprising a Gaussian beam or a doughnut beam into said crystal surface, thereby creating a free charge carrier (FCC) density pattern; and
   a collinear probe beam into said crystal surface, thereby controlling the lateral and temporal transmission of said probe beam, wherein said free charge carrier (FCC) density pattern is controlled by a vortex plate with a topological order of 0 to 8.

2. A super resolution imaging system for obtaining an image in a crystal, comprising:
   a laser configured to project a pump beam and a probe beam collinearly into said crystal surface;
   a vortex phase plate positioned between said pump beam source and said crystal; and
   a control unit configured to control the shape of said pump beam, thereby controlling the lateral and temporal transmission of said probe beam.

3. The system of claim 2, wherein said control unit is configured to provide a predetermined beam pulse width and wavelength of said pump beam and said probe beam.

4. The system of claim 2, wherein said control unit is configured to control said vortex phase plate topological order from 0 to 8.

5. The system of claim 2, wherein said control unit is configured to control the distance of said pump beam focal point.

* * * * *